United States Patent [19]
Oas et al.

[11] Patent Number: 5,761,908
[45] Date of Patent: Jun. 9, 1998

[54] APPARATUS SUITED FOR VENTILATING ROOMS CONTAMINATED WITH INFECTIOUS DISEASE ORGANISMS

[75] Inventors: Heidi D. Oas, Minneapolis; Dennis E. Welch, Ramsey, both of Minn.

[73] Assignee: Air Quality Engineering, Minneapolis, Minn.

[21] Appl. No.: 257,883

[22] Filed: Jun. 10, 1994

[51] Int. Cl.$^6$ .............................. F24H 3/00; F24F 11/02; F24F 11/04
[52] U.S. Cl. ................... 62/3.2; 62/3.3; 62/3.6; 62/3.7; 62/90; 62/95; 165/54; 165/11.1; 165/246; 165/234; 454/238
[58] Field of Search ................ 62/3.3, 3.2, 95, 62/3.6, 3.7, 90; 165/54, 11.1, 246, 234; 454/238

[56] References Cited

U.S. PATENT DOCUMENTS

| | | | |
|---|---|---|---|
| 2,949,014 | 8/1960 | Belton, Jr. et al. | 62/3.2 |
| 3,040,538 | 6/1962 | Alsing | 62/3.2 |
| 3,077,079 | 2/1963 | Pietsch | 62/3.7 |
| 3,137,142 | 6/1964 | Venema | 62/3.2 |
| 3,474,632 | 10/1969 | Newton | 62/3.2 |
| 3,601,031 | 8/1971 | Abel et al. | 98/33 |
| 3,614,922 | 10/1971 | Sobin | 98/32 |
| 3,666,007 | 5/1972 | Yoshino et al. | 165/909 |
| 3,774,522 | 11/1973 | Marsh | 98/33 R |
| 4,045,192 | 8/1977 | Eckstein et al. | 55/222 |
| 4,149,590 | 4/1979 | Ospelt | 165/909 |
| 4,164,901 | 8/1979 | Everett | 98/33 A |
| 4,191,543 | 3/1980 | Peters | 55/279 |
| 4,252,054 | 2/1981 | Bakels | 98/115 R |
| 4,407,185 | 10/1983 | Haines et al. | 98/1.5 |
| 4,484,563 | 11/1984 | Fritz et al. | 126/299 D |

(List continued on next page.)

FOREIGN PATENT DOCUMENTS

| | | | |
|---|---|---|---|
| 4002560 | 8/1991 | Germany | 165/54 |
| WO81/01739 | 6/1981 | WIPO | 62/3.6 |

OTHER PUBLICATIONS

Bio Shield™ Manual (pp. 28–35) AiroClean Inc., Exton, PA (no date).
Honeywell brochure—The "Perfect Window" Energy Recovery Ventilator (4 pp) (no date).
TRI DIM Filter Corp.—Absolute Contamination Control Equipment (4 pp) (no date).
Isolaide® brochure—Isolation Rooms and Chambers (15 pp) (no date).
TherMax brochure—Energy Recycling Ventilation Systems for Improved IAQ (15 pp) (no date).
Brochure—Sun Twin 100–UV Indoor Air Pathogen Control System (2 pp) (no date).
teca™ brochure —World Class Cooling (50 pp) (no date).
ITI FerroTec Manual (6 pp) (no date).

*Primary Examiner*—John K. Ford
*Attorney, Agent, or Firm*—James V. Harmon

[57] ABSTRACT

A self-contained ventilation apparatus is disclosed for ventilating buildings, e.g., patient rooms such as hospital rooms, waiting rooms, hospital operating rooms, doctors' offices, and clinics, especially rooms contaminated with infectious microorganisms. One or more blowers is provided. When there are two blowers, a first blower is provided for discharging room air to the atmosphere and a second blower is provided for introducing fresh outside air to the room to provide a continuous supply of fresh air to the room which is free of disease organisms. Both streams of air pass through an air-to-air heat exchanger to adjust the temperature of the incoming air to approach that exhausted from the room. When filters are used, both currents of air are preferably filtered, e.g., with a high efficiency particle air (HEPA) filter. Provision is made for automatically maintaining room air pressure at the desired value (typically below that of surrounding rooms) as filters gradually become clogged with dust. Supplemental heat or cold is supplied to incoming air by locating semiconductive thermoelectric cooling modules between incoming and outgoing air streams. Optional thermoelectric modules also dehumidify or warm incoming air depending on the season.

12 Claims, 14 Drawing Sheets

U.S. PATENT DOCUMENTS

| | | | |
|---|---|---|---|
| 4,489,881 | 12/1984 | Dean et al. | 236/49 |
| 4,498,373 | 2/1985 | Duttmer et al. | 98/33.1 |
| 4,560,395 | 12/1985 | Davis | 55/276 |
| 4,604,111 | 8/1986 | Natale | 55/97 |
| 4,667,579 | 5/1987 | Daw | 98/33.1 |
| 4,735,130 | 4/1988 | Seppamaki | 98/34.6 |
| 4,756,728 | 7/1988 | Conrad | 55/385 |
| 4,804,392 | 2/1989 | Spengler | 55/356 |
| 4,817,708 | 4/1989 | Ono et al. | 165/54 |
| 4,863,374 | 9/1989 | Vukovich, Jr. | 432/121 |
| 4,902,315 | 2/1990 | Spicer | 55/97 |
| 4,978,295 | 12/1990 | Vukovich, Jr. | 432/120 |
| 5,004,483 | 4/1991 | Eller et al. | 55/20 |
| 5,009,685 | 4/1991 | Wilson et al. | 55/385.2 |
| 5,024,263 | 6/1991 | Laine et al. | 165/54 |
| 5,029,518 | 7/1991 | Austin | 98/31 |
| 5,042,997 | 8/1991 | Rhodes | 55/126 |
| 5,074,897 | 12/1991 | Sikich | 55/385.2 |
| 5,080,004 | 1/1992 | Francis et al. | 454/341 |
| 5,090,972 | 2/1992 | Eller et al. | 55/20 |
| 5,131,887 | 7/1992 | Traudt | 454/255 |
| 5,179,998 | 1/1993 | DesChamps | 62/90 |
| 5,195,334 | 3/1993 | Lang et al. | 62/305 |
| 5,197,920 | 3/1993 | Ganse | 454/228 |
| 5,205,783 | 4/1993 | Dieckert et al. | 454/238 |
| 5,225,167 | 7/1993 | Wetzel | 422/121 |
| 5,226,298 | 7/1993 | Yamamoto et al. | 62/3.4 |
| 5,257,736 | 11/1993 | Roy | 165/54 |
| 5,431,021 | 7/1995 | Gwilliam et al. | 62/3.2 |

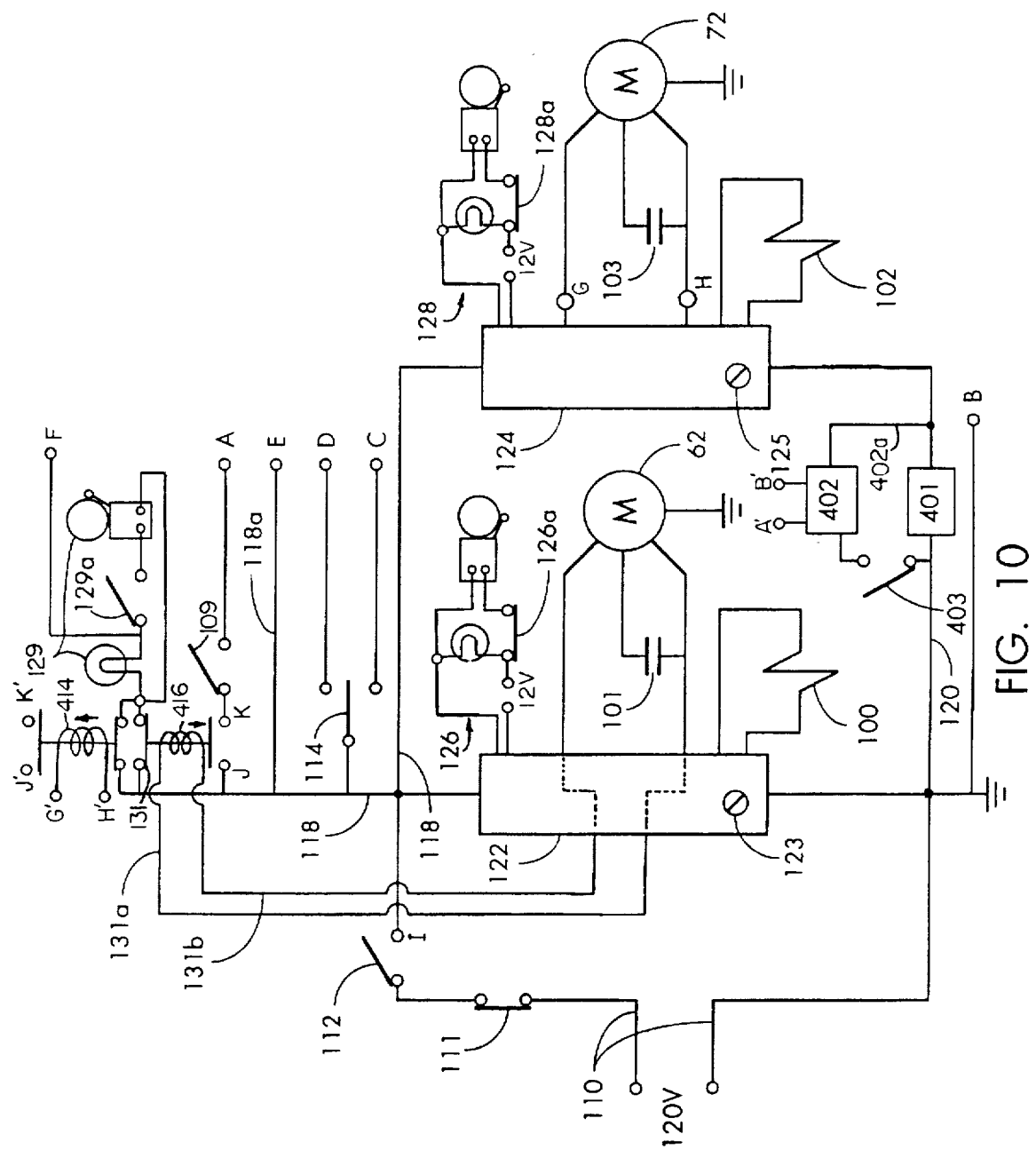

5,761,908

APPARATUS SUITED FOR VENTILATING ROOMS CONTAMINATED WITH INFECTIOUS DISEASE ORGANISMS

FIELD OF THE INVENTION

This invention relates to ventilation and more particularly to a ventilation system that is particularly well suited for ventilating rooms contaminated with disease organisms.

BACKGROUND OF THE INVENTION

The ventilation of hospital or clinic rooms or other patient rooms contaminated with infectious disease organisms has become a more serious problem in recent months, particularly due to the spread of antibiotic-resistant organisms. One example is the rapid proliferation of antibiotic-resistant strains of the tuberculosis bacillus which has caused serious outbreaks of tuberculosis that are difficult or impossible to treat, creating an emergency situation exacerbated by the spread of the infection to hospital staff personnel in some instances. To reduce the spread of disease, it is necessary to remove contaminated air and provide clean, uncontaminated air to the room in which the infected patients are treated while at the same time preventing disease organisms from escaping into adjoining rooms and hallways or to the outside. It is also desirable to prevent excessive heat loss or gain from the room, preferably while controlling the temperature and humidity of the incoming air.

Previous attempts to accomplish some or all of these objectives have not been entirely successful. U.S. Pat. No. 4,191,543, for example, describes a sterile air recycling apparatus for clean rooms, surgery theaters, patient care rooms, etc. in which room air is passed through a high efficiency particulate air (HEPA) filter, optionally with fresh or plant-conditioned air added. Air is exhausted from the room through a remote outflow grill that is not part of the unit. One problem with this approach is the loss of heat from the room and the possible escape of disease organisms through room outlet ducts and through cracks and crevices around doors or other openings. In addition, there is no provision in the apparatus for changing the temperature of incoming air or for dehumidifying the air because the device depends upon a central air conditioning system for supplying plant-conditioned air. By contrast, a major objective of the present invention is to provide a self-contained ventilating unit that will furnish excellent ventilation for rooms contaminated with disease organisms without being dependent upon or requiring connection to a plant air conditioning system, i.e., central air conditioning or central heating.

U.S. Pat. No. 4,489,881 describes another air delivery system for hospital rooms to which conditioned air is delivered by a plant-conditioned air delivery unit (central air conditioning) and in which room air is kept at a pressure slightly higher than the pressure level in the hallway and other surrounding areas. This, however, allows disease organisms to escape into surrounding rooms and corridors. In addition, a system of this kind that is built into a central air conditioning system is prohibitively expensive for use in many hospital or other sick room applications. To overcome this problem, it is an object of the present invention to provide a sick room ventilation system that isolates disease organisms, is self-contained and can be retrofitted in existing buildings.

U.S. Pat. No. 5,225,167 describes a self-contained room air sterilizer. However, the room air is drawn in through an intake at the bottom of the unit, is filtered and then the same air is returned to the room. When room air is returned to the same room, it is possible to reintroduce infectious disease organisms. Vapor and gas will be entirely returned and no fresh air will be provided. An object of the present invention is to provide a self-contained ventilating unit that can draw in fresh outside air for ventilating the room and remove virtually all disease organisms from room air that is exhausted to the atmosphere, in this way eliminating any chance for disease organisms to be dispersed into the atmosphere or reintroduced into the room.

Other kinds of ventilating units have been previously proposed, e.g., U.S. Pat. No. 4,817,708 describes two blowers connected to a single drive motor for passing air through a heat exchanger in opposite directions. Incoming air is passed through a filter to remove trapped dust and pollen. The room is kept at a pressure higher than the surrounding area to prevent particles outside the room from being introduced into the room through gaps or crevices, but this allows disease organisms to escape. To keep the proper pressure in the room, the filter has to be changed at preset periodic intervals. This is an important shortcoming in ventilating patient rooms in which the air is contaminated since routine maintenance can be and often is overlooked, resulting in a change of room pressure. In the present system, room pressure is set lower than in surrounding areas. A change in this pre-set relationship caused by a clogged filter would contaminate surrounding areas with disease organisms which would of course defeat the main purpose of the present invention. In addition, there is no provision in the patent for providing supplemental heat or for chilling incoming air or for dehumidifying incoming air.

SUMMARY OF THE INVENTION

The present invention provides a self-contained ventilation apparatus and method for ventilating rooms such as hospital rooms, waiting rooms, hospital operating rooms, nursing homes, doctors' offices, dedicated smoking rooms, and clinics. One or two blowers are provided. When two blowers are being used, a first blower is provided for discharging room air to the atmosphere and a second blower is provided for introducing outside air to the room. Both currents of air pass through a heat exchanger to recover heat from the exhausted air so as to provide a continuous supply of fresh air to the room that is free or virtually free of disease organisms. When filters are used, both currents of air are preferably filtered, preferably with a high efficiency particle air (HEPA) filter. When only one blower is used, at least the incoming air is preferably filtered. In a preferred form of the invention, provision is made for automatically maintaining room air pressure at the desired level even as filters gradually become clogged with particulate matter.

Optional features of the invention include supplemental temperature and humidity control. Supplemental heat or cold is imparted to incoming air by locating semiconductive thermoelectric cooling units between incoming and outgoing air currents to efficiently heat or cool the incoming air and to dehumidify incoming air if desired.

The invention can be used to ventilate rooms contaminated with disease organisms by exhausting air from the room while introducing fresh air from the outside in such a way that the streams of air are kept separate as they pass in heat conductive relationship with each other to help keep the air entering the room close to the temperature of the air withdrawn from the room. Each air stream is filtered to remove particulate material including disease organisms.

The provision for controlling room pressure has a means for sensing the quantity of air (CFM) of at least one but preferably both air streams or for alternatively sensing the room air pressure throughout operation so that when the filters become clogged with particulate material, the relative speed of the blower can be controlled so as to maintain a negative room air pressure and thereby prevent disease organisms in the room from escaping to other parts of the building. With exhaust pressure lower than supply, air will pass from supply to exhaust air through any leaks in the heat exchanger.

The invention can also be used in other applications such as private homes, restaurants, bars, nursing homes, dedicated smoking rooms, and industrial applications that require very clean air or fresh air exchange.

These and other more detailed and specific objects of the present invention will be better understood by reference to the following figures and detailed description which illustrate by way of example but a few of the various forms of the invention within the scope of the appended claims.

THE FIGURES

FIG. 10 is a schematic diagram showing the blower motor controls;

DETAILED DESCRIPTION OF THE INVENTION

Figure 1:
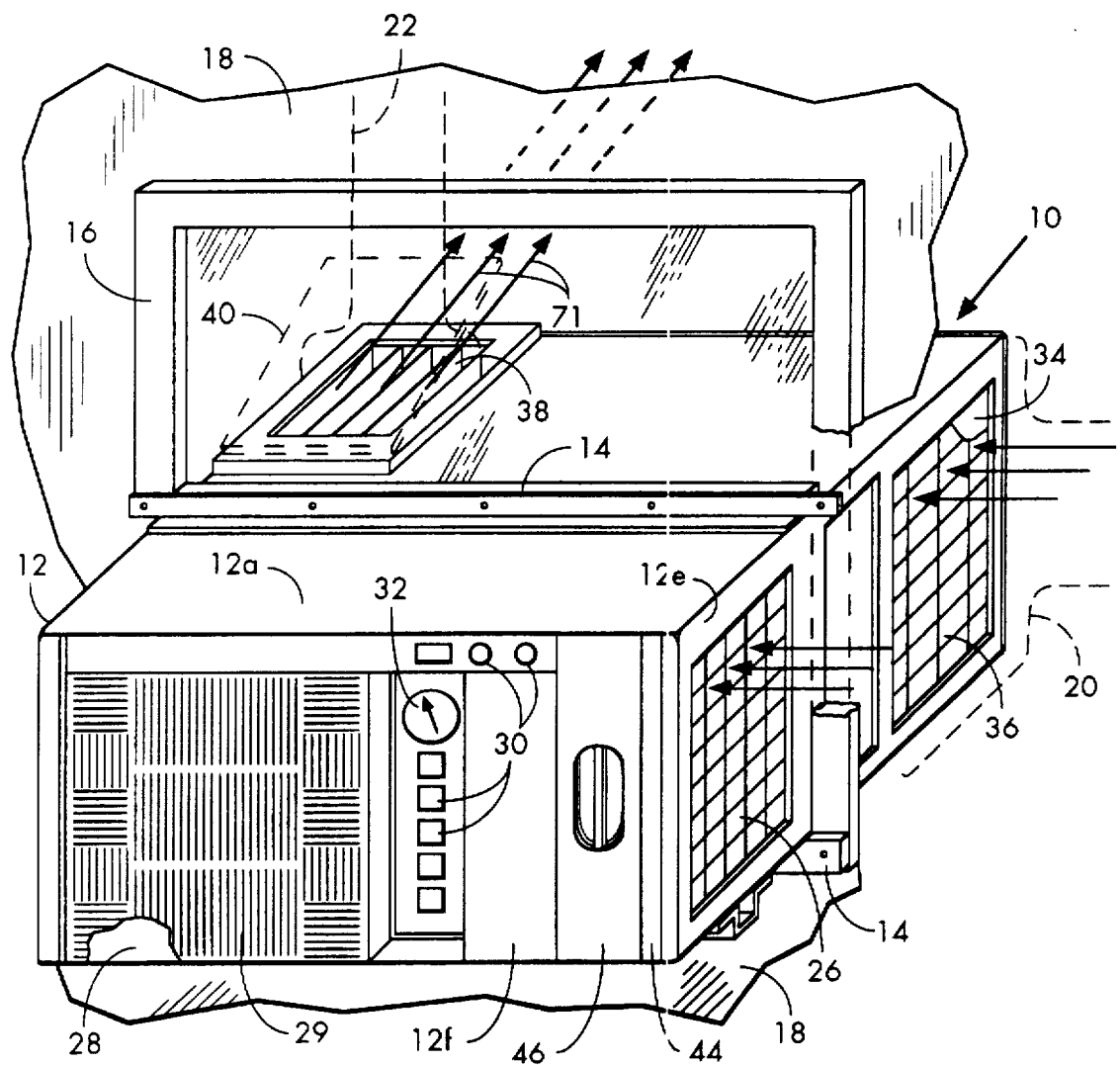
FIG. 1 is a perspective view of the invention, in this instance installed in a window opening.

Refer now to the figures and particularly to FIGS. 1–5 which illustrate a ventilating apparatus or unit 10 in accordance with the invention which has a box-like housing 12 that includes top, bottom and side panels 12a–12f. The housing 12 can be made of plastic such as fiberglass reinforced plastic to make it more effective in reducing thermal energy transfer from the outside of the building to the inside. Components of the housing 12 also give the ventilating unit 10 the required structural integrity. At approximately the center of the unit 10 is a horizontal mounting bracket 14 that is secured to the housing 12 so as to extend transversely for fastening the unit 10, in this case in a window opening 16 of a building wall 18 (FIGS. 1 and 2) generally in the same manner as an ordinary window air conditioner, so that approximately half of the ventilating unit 10 nearest the observer projects into the room and the other half outside the window opening 16 extends outside away from the building. For applications in which the ventilating unit 10 cannot be mounted in an existing window opening 16 within the wall 18 of a building, the unit 10 can be mounted on wheels (not shown) or hung from the ceiling and provided with externally mounted inlet air duct 20 and outlet air duct 22 which are run through an existing window, wall, ceiling or to other ductwork communicating with the outside of the building. With minor changes, the unit can be mounted horizontally or vertically through a building wall or, with an additional plenum (not shown), the unit can be turned upright and mounted flat against the wall or window. Holes through the wall or window for the supply and exhaust air would then be required.

FIG. 1 shows a right-hand version of the invention. The portion of the ventilator 10 inside the building has an air exhaust inlet opening at 24 covered by an open grill 26, a fresh air outlet at 28 covered by an open grill 29, and a control panel 30 which has an on/off switch, selector switches to be described below, and, if desired, a digital airflow monitoring display 32 to show the speed and/or volume of air entering the room. The portion of the ventilator unit 10 on the outside of the wall 18 has a fresh air inlet opening 34 which is covered by an open grill 36, and an air exhaust outlet which is covered by an open grill 38 and an air deflector 40.

In a left-hand version (not shown), the room exhaust grill is placed on the front surface facing the viewer in FIG. 1 and the outside air intake is placed on the right side of the unit. Air entering the room will enter through a grill on the right side of the unit instead of the front, as shown in FIG. 1. If desired, the room exhaust grill can be located on the left-hand side of the housing 12 and the outside air inlet is on the front of the unit but toward the right side. This can be accomplished by inverting the unit 10.

Figure 2:
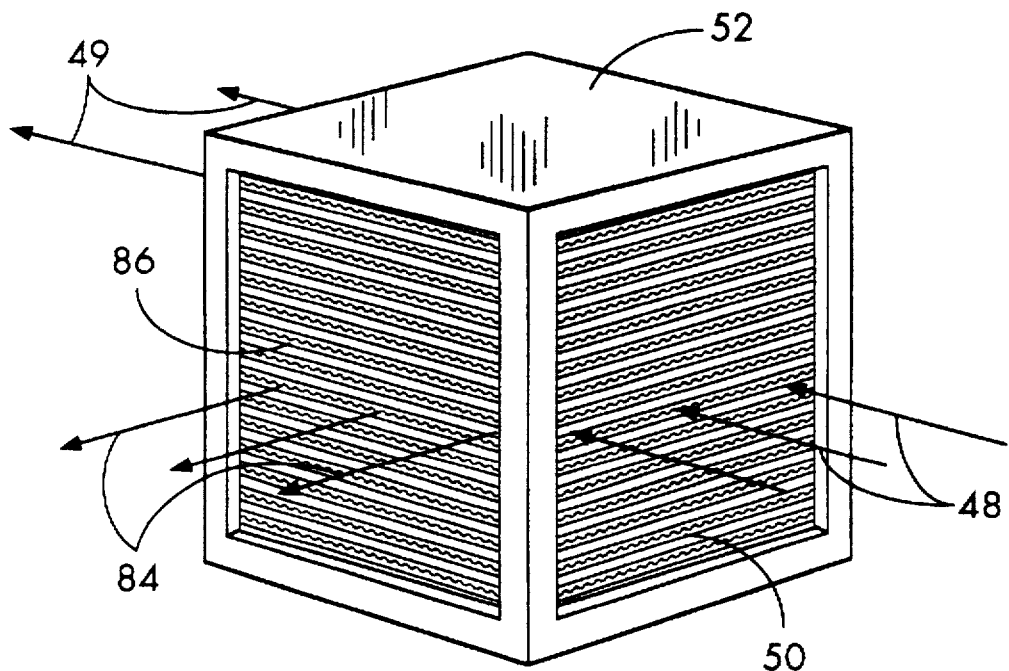
FIG. 2 is a perspective view of a heat exchanger of the type used in the invention.
Figure 3:
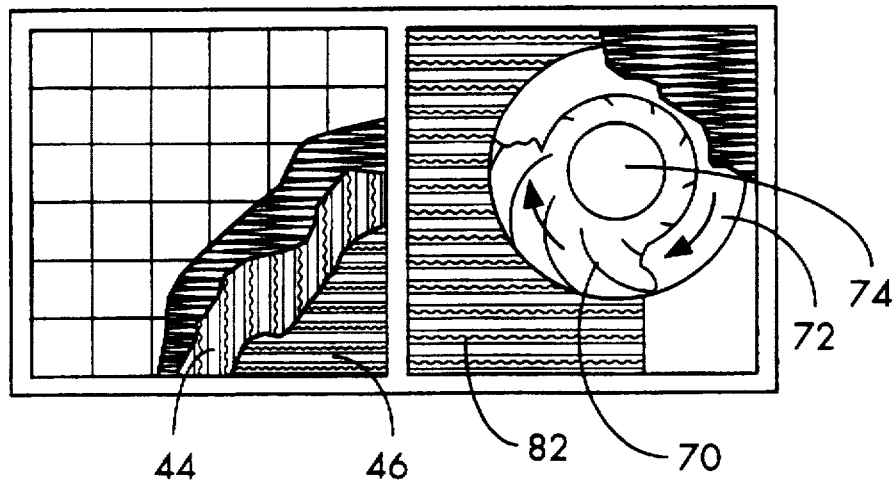
FIG. 3 is a vertical sectional view taken on line 3—3 of FIG. 4.
Figure 4:
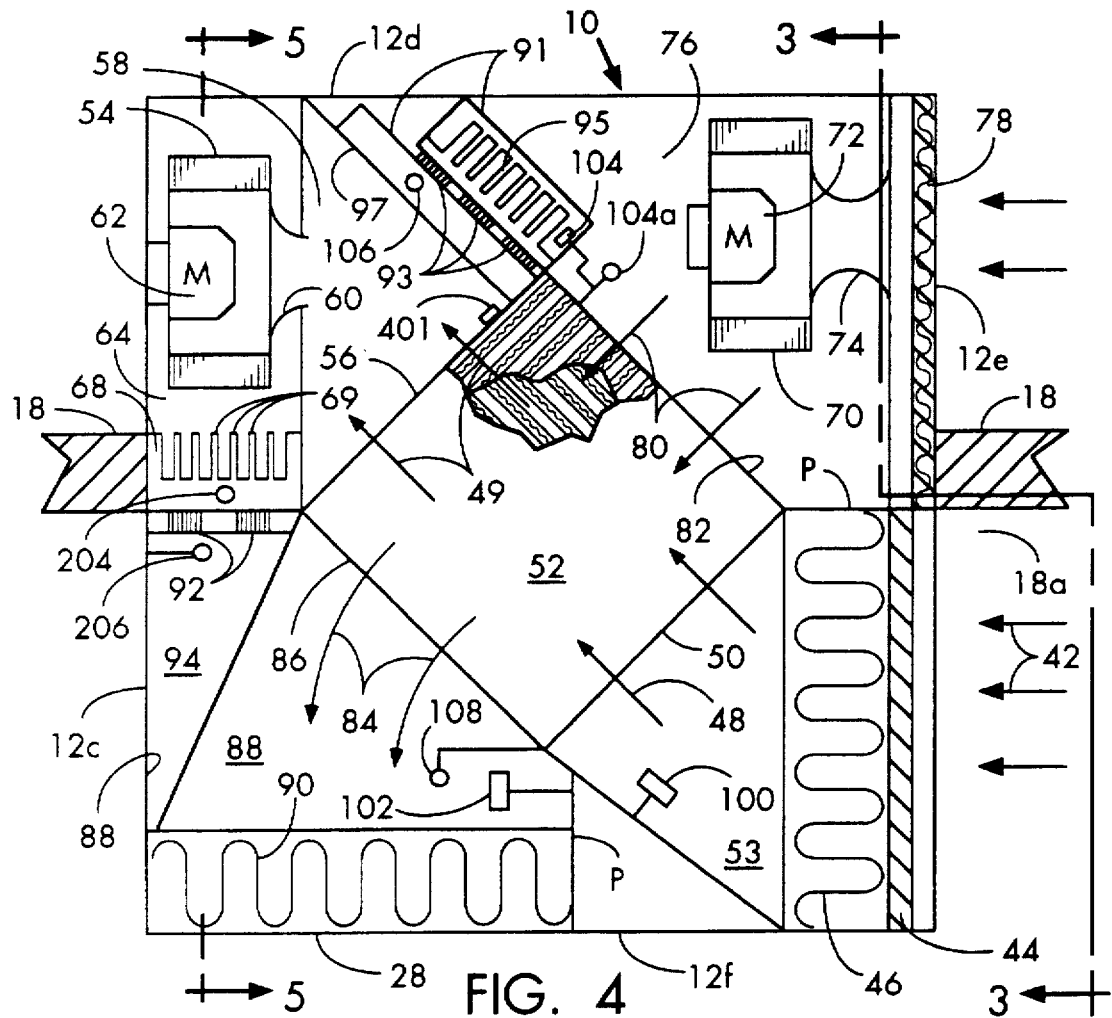
FIG. 4 is a semi-diagrammatic top plan view of the invention with the top panel removed.
Figure 5:
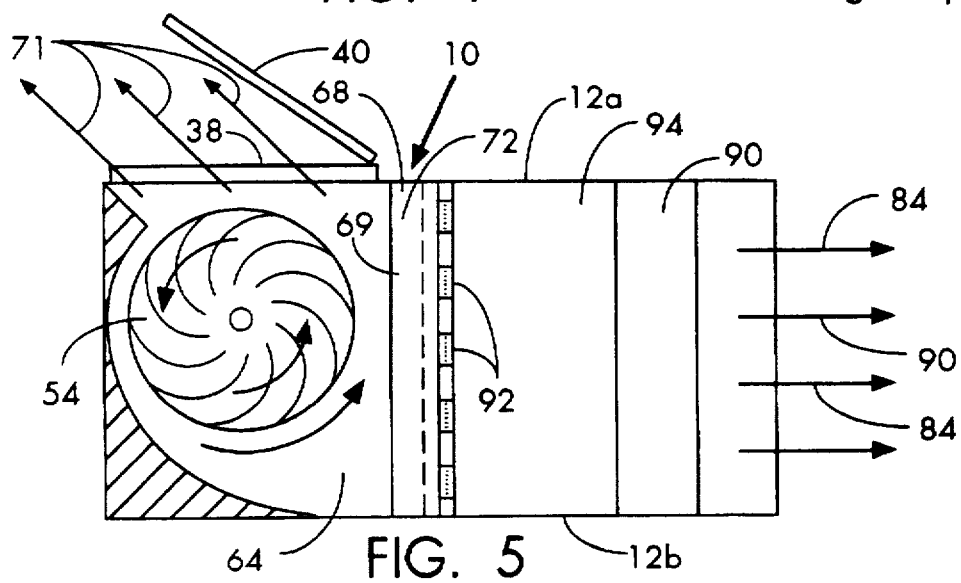
FIG. 5 is a vertical sectional view taken on line 5—5 of FIG. 4.

The path taken by air exhausted from the room will now be described. As shown in FIG. 4, air being exhausted from the room at 42 passes first through a pre-filter 44, in this case of rectangular configuration, and then through a HEPA or ULPA filter 46. From there, room air that is being exhausted passes at 48 through one inlet opening 50 of a cross-current heat exchanger 52 (FIGS. 2 and 4). Exhaust air is guided by an air duct 53 and, after passing through the cross-current air-to-air heat exchanger 52, is drawn into the exhaust blower or fan 54 which communicates with the outlet exhaust air opening 56 of the cross-current heat exchanger 52 through a duct 58. Air enters the blower 54 through an orifice ring 60. The blower 54 is driven by means of an electric motor 62 such as a permanent split-capacitor motor or other variable speed motor. Air passing through the blower 54 enters an outlet plenum 64 which is bounded on one side by a finned heat sink 68, preferably but not necessarily formed from an extrusion of aluminum or other heat conductive metal, having parallel fins at 69 which extend in heat conductive relationship with the room air being exhausted at 71. Thus, during operation the motor 62 turns the blower or fan 54, causing air at 42 to be drawn through the pre-filter 44 and the HEPA filter 46, then through the cross-current heat exchanger 52, finally exhausting at 71 through the grill 38 and air deflector 40 covering the outlet opening and into the atmosphere outside the building.

The course taken by the air drawn into the room from outside will now be described. Outside air is drawn into the apparatus 10 through the open grill 36 by means of a fan or blower 70 connected to a drive motor 72. Air enters through a prefilter 78 and then passes into the blower 70 through a ring-shaped air inlet guide 74 and is then directed through a duct 76 where it enters, as shown at 80, an air inlet opening 82 communicating with passages that extend through the cross-current heat exchanger 52 where heat is exchanged with the room air which is being exhausted at 49. Filter 78 is located on the outside of the building wall 18 in a position outside the building covering the inlet duct 74 and the blower or fan 70. Both of the pre-filters 44 and 78 are made removable so they can be easily replaced to preserve the life of the HEPA filters 46 and 90. After passing through the heat exchanger 52, the fresh outside air exits the heat exchanger 52 at 84 through an outlet opening 86 and is guided by ductwork 88 through a filter such as a HEPA filter 90. The filters 46 and 90 preferably filter the exhaust air and the incoming fresh air through a 0.3 micron HEPA filter or a 0.12 micron ULPA filter or a combination thereof. If desired, ultraviolet lights can be mounted in the air ducts to kill micro-organisms in incoming air or in exhaust air, and in some cases can be used in place of HEPA or ULPA filters, if desired. The filtered fresh air then passes into the room through the open grill 29 covering the opening 28. The outside air 84 has, at this point, recovered about 75% or more of the heat from the exhausted air 48, thereby reducing heat loss from the room in the winter and minimizing heat gain in the summer. Heat is recovered by the heat exchanger 52 at an efficiency of about 75% or more.

Figure 6:
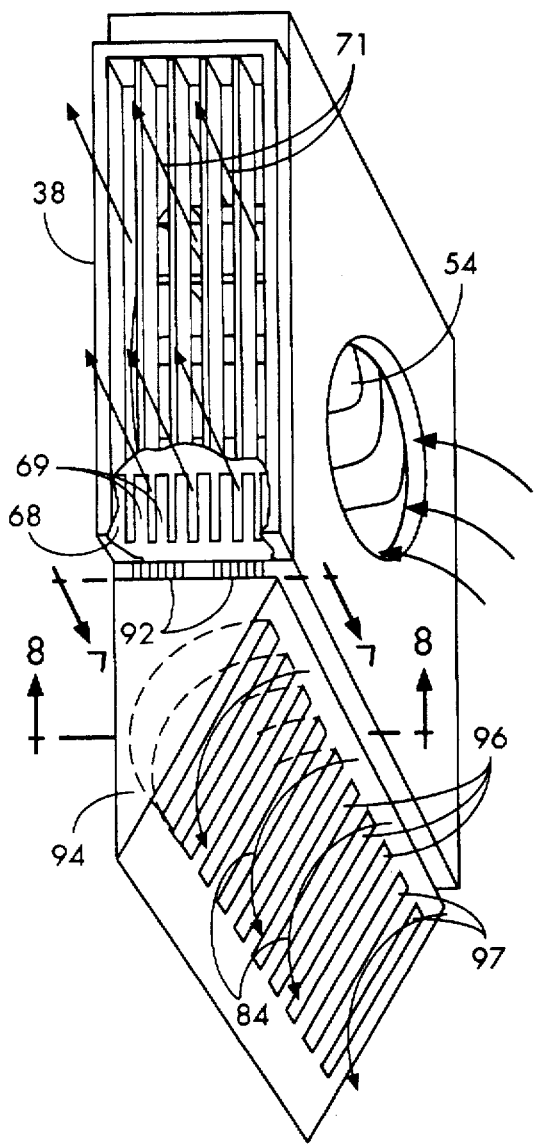
FIG. 6 is a perspective view of the thermoelectric cooling units and associated structure.
Figure 8:
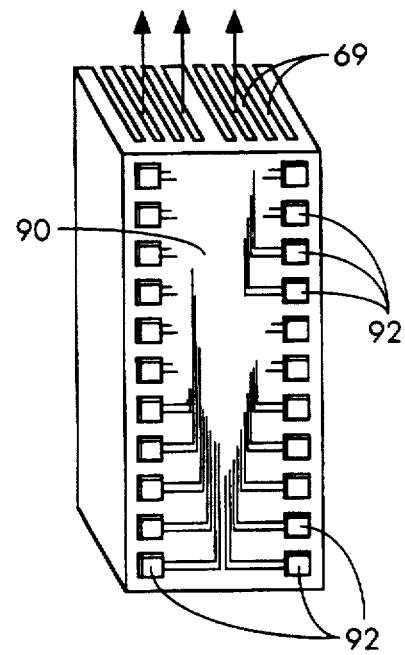
FIG. 8 is a cross-sectional view taken on line 8—8 of FIG. 6.
Figure 7:
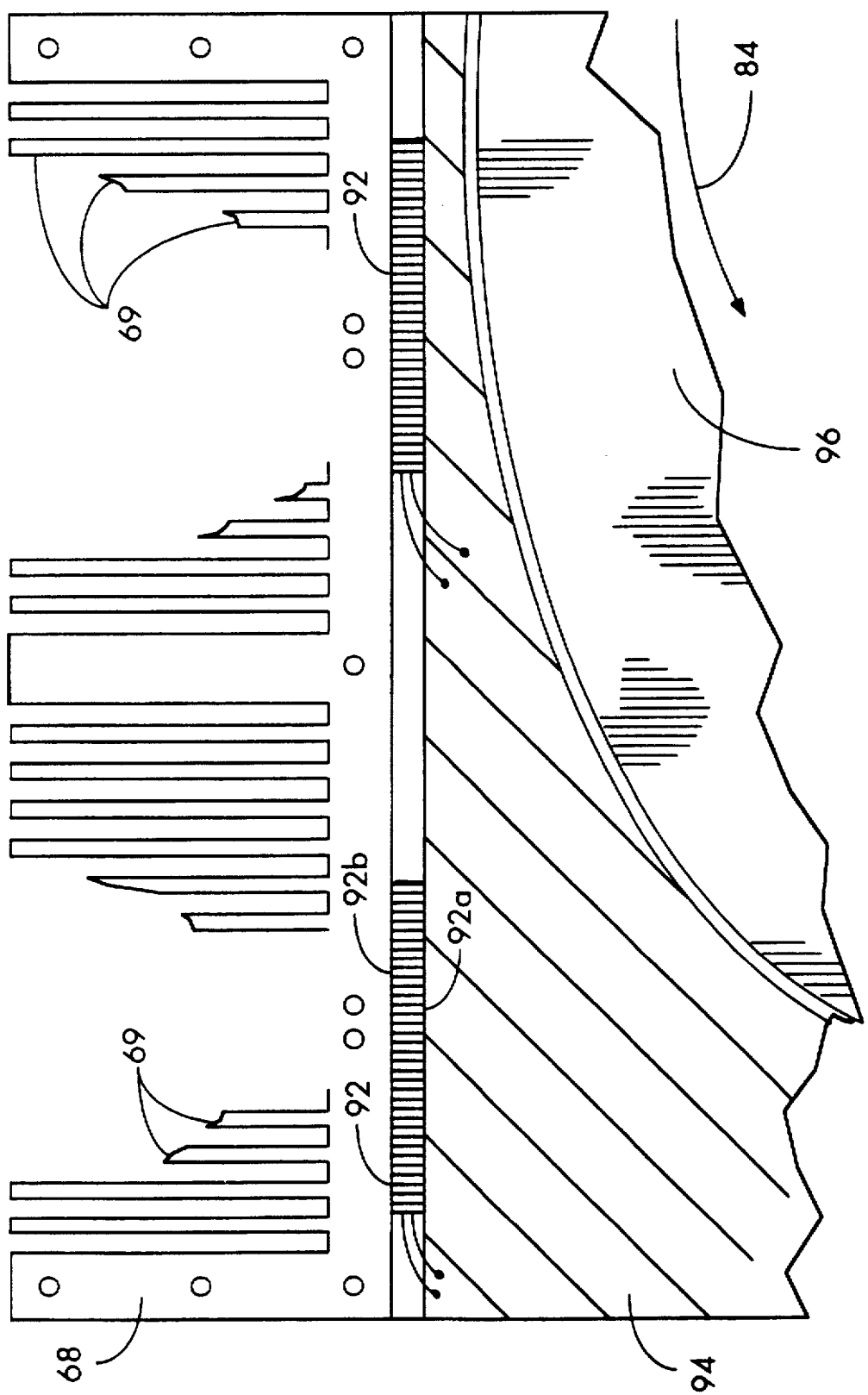
FIG. 7 is a partial sectional view taken on line 7—7 of FIG. 6 on a much larger scale.

A heating or cooling assembly that is used for providing auxiliary heat or for withdrawing heat from incoming air will now be described, especially with reference to FIGS. 6 and 7. The finned heat sink 68 has a flat outer surface 90 to which are clamped in heat transfer relationship semiconductive thermoelectric heating/cooling modules 92 of known construction that operate on the Peltier principle. While the number of thermoelectric modules 92 can vary, in this case two rows of 12 modules are used to provide a total of 24 thermoelectric modules 92. For convenience, the thermoelectric modules will be referred as "thermoelectric cooling modules." It will be understood, however, that when electrically energized one surface of each module 92 becomes hot and the other becomes cold, but by reversing the polarity of the current hot and cold surfaces are also reversed. The other surface of each module 92 is bonded to a finned heat sink 94 which has a plurality of parallel fins 96 separated by slots 97 at a spacing of about 4 per inch in heat exchange relationship with the fresh air 84 just before it enters the room. One suitable thermoelectric cooling module is a module sold under Model 6300/127/085 by Ferrotec International Thermoelectric, Inc. of Chelmsford, Mass. Other commercially available thermoelectric modules can of course be used, if desired. The supplemental heating and cooling arrangement provides an efficient way of dissipating waste heat by incorporating the finned heat sink 68 in the discharge stream of the exhaust blower 54. By placing the supplemental heating modules 92 between the incoming and outgoing air streams after air has passed through the heat exchanger 52, heating or cooling of the incoming air can be carried out with the greatest efficiency since the temperature of the incoming air has already been changed to approach that of the room air. The thermoelectric units 92, as well as 93 to be described, can be thought of as a heat pump means. Although not preferred, the thermoelectric units 92, 93 can be replaced by the type of heat pump that uses a mechanical compressor and is encompassed by the expression "heating/cooling module" as used herein.

Figure 9:
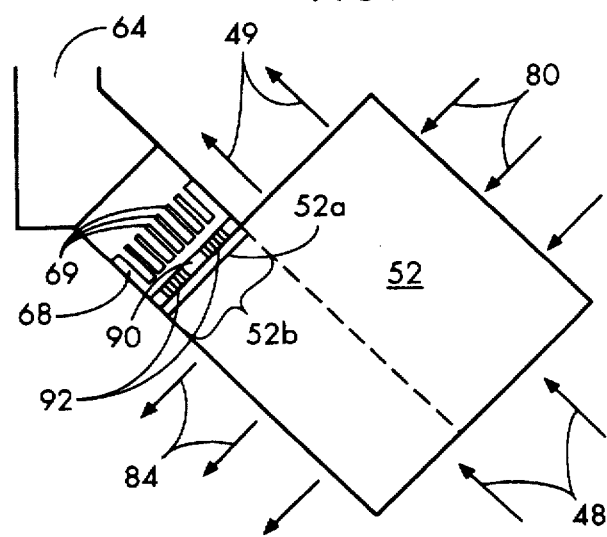
FIG. 9 is a top plan view of a modified form of the invention.

Refer now to FIG. 9 which illustrates an alternative positioning of the thermoelectric cooling modules 92. In this case the finned heat sink 68 is turned at a 45° angle and is placed so that its flat surface 90 faces the cross-current flow heat exchanger 52. A metal plate 52a is bonded to the adjacent face of the heat exchanger 52 and the cooling modules 92 are clamped between the finned heat sink 68 and the plate 52a of the heat exchanger 52 so that the heat or cold produced by the modules 92, depending upon the polarity of the current, is transferred directly to the heat exchanger 52 in the zone designated 52b. Accordingly, the finned heat sink 94 is in this case eliminated. The configuration of FIG. 9 is most effective when the heat exchanger 52 is formed from a heat conductive metal such as aluminum, copper, or other metal. Various other kinds of heat exchangers 52 can be used. For examples the heat exchanger 52 can be a counter-current flow, heat exchanger, cross-flow, single pass, double pass, tube and fin metal, cellulose, drum-type, etc.

Figure 16:
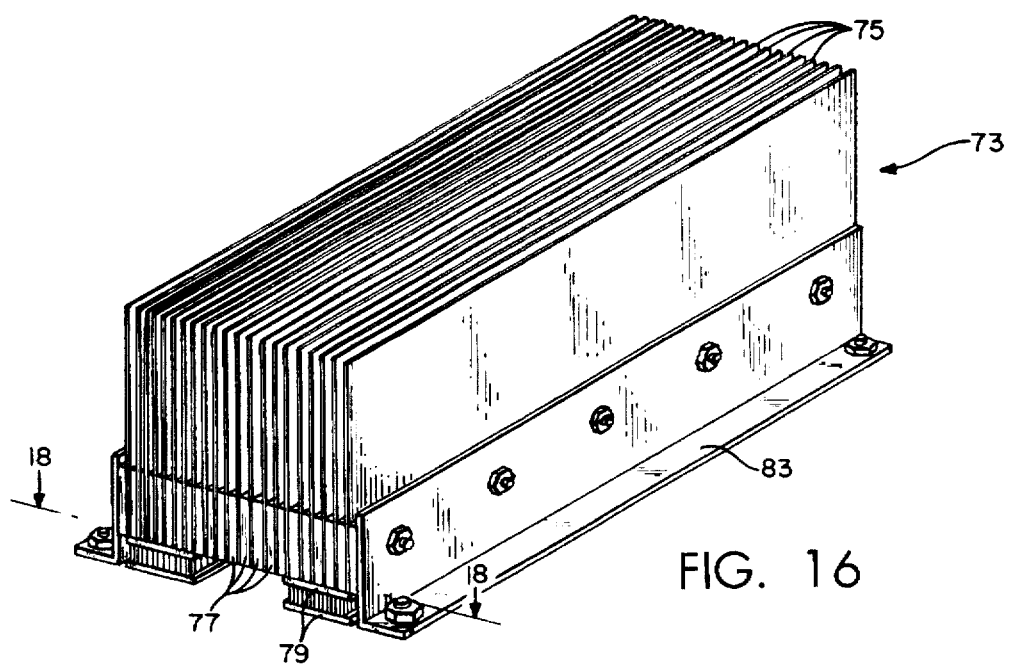
FIG. 16 is a perspective view of a modified form of heat sink in accordance with the invention.
Figure 17:
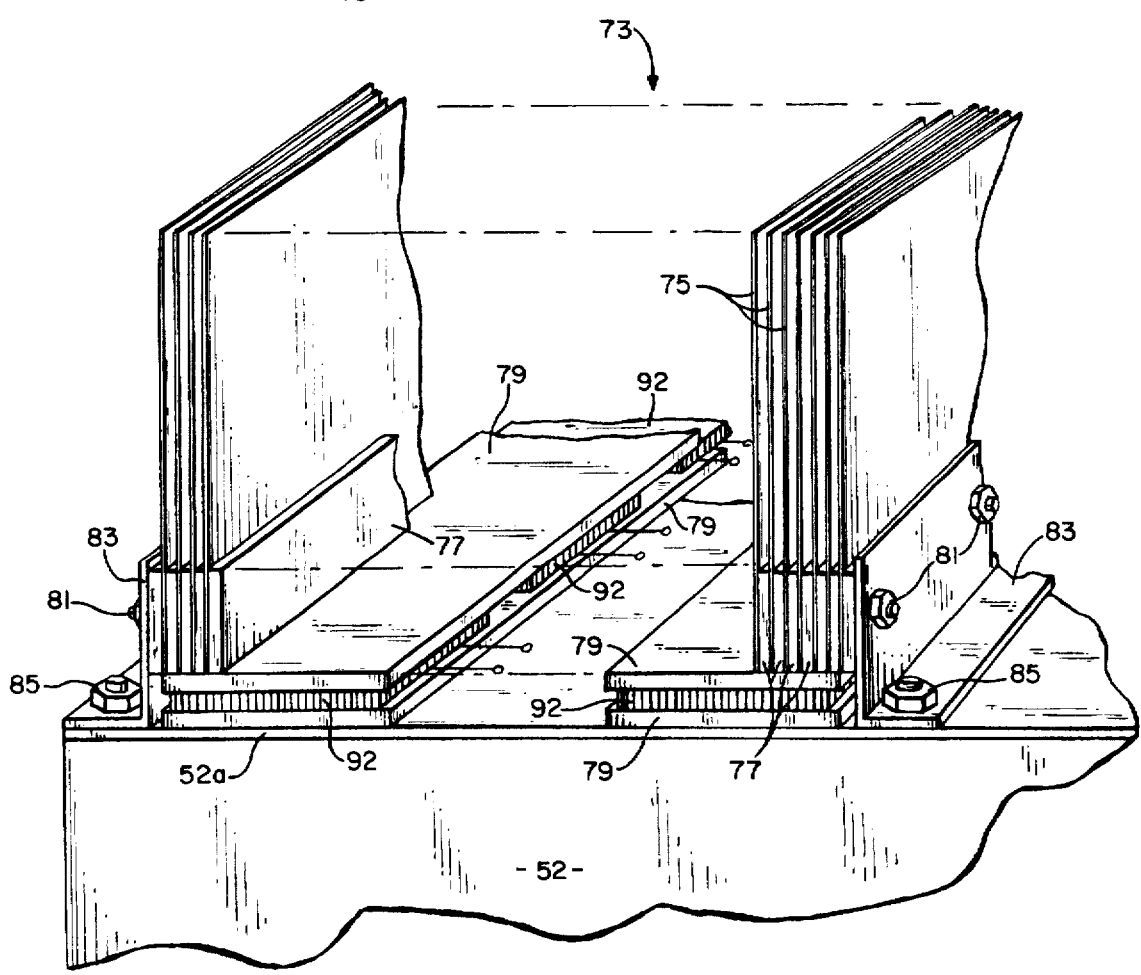
FIG. 17 is an enlarged partially broken away view of the left end of the heat sink of FIG. 16.
Figure 18:
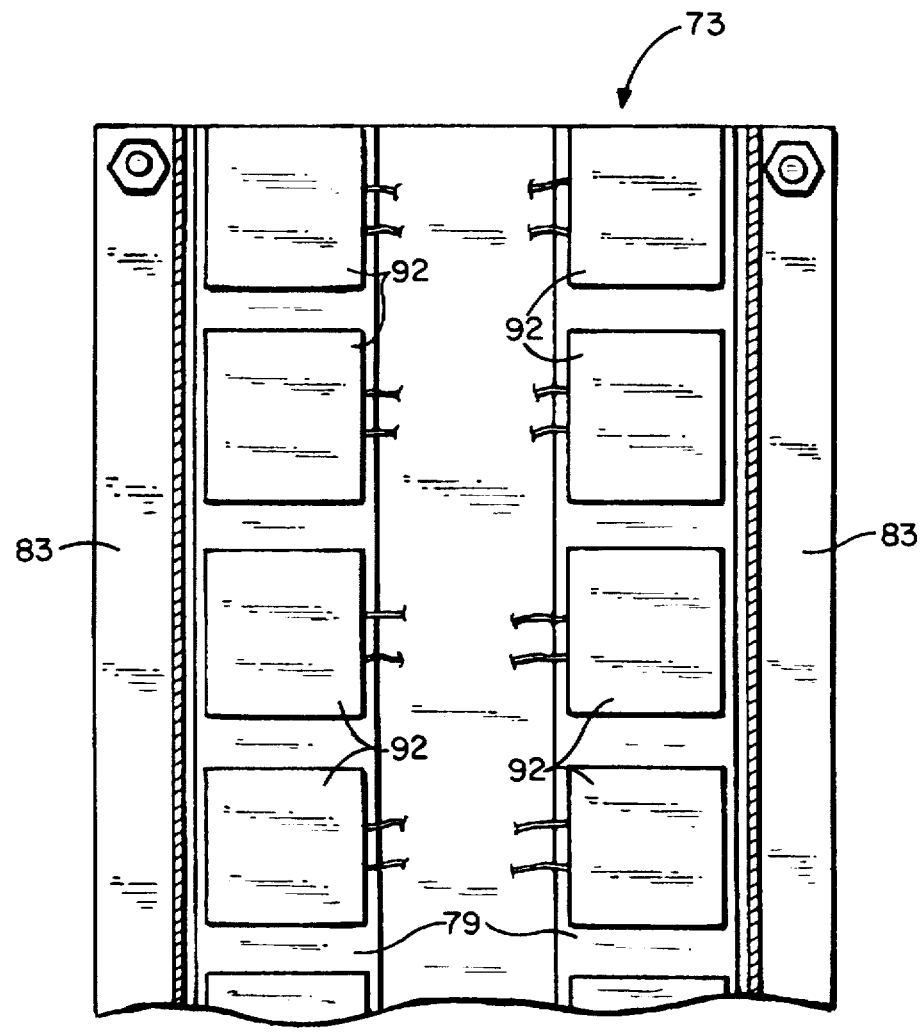
FIG. 18 is a horizontal cross-sectional view taken on line 18—18 of FIG. 16 on a slightly enlarged scale.

Refer now to FIGS. 16-18 which illustrate a modified form of heat sink in accordance with the invention. In this case, the heat sink indicated at 73 is built up from separate pieces including parallel longitudinally extending metal cooling fins 75 separated by longitudinally extending spacer plates 77 of the same length as fins 75 but much shorter in height to provide air spaces between the metal cooling fins 75. The cooling fins 75 can be 0.02 inch aluminum plate and the spacer plates 77 can be 0.08 inch aluminum plate The heat sink 73 also includes spaced apart horizontally disposed base plates 79 between which are sandwiched the thermoelectric cooling modules 92. The heat sink 73 is held together by fasteners such as nuts and bolts 81 which extend through angle brackets 83 which in turn are fastened, e.g., by bolts 85 to the heat exchanger 52. Heat is then transferred from the module 92 to and from the heat exchanger 52 through the metal plate 52a in the same manner already described in connection with FIG. 9. The invention thus provides a new form of heat sink 73 comprising a plurality of parallel, longitudinally extending spaced apart metal cooling fins 75 alternating with a plurality of spacer plates 77 having a height which is only a small fraction of the height of the metal cooling fins 75 with fasteners extending through both sets of plates to hold them together in a sandwiched configuration together. The upper base plates 79 are connected in heat conductive relationship with the cooling fins 75 and spacer plates 77. The lower base plates 79 are in heat conductive relationship with the thermoelectric cooling modules 92 and the heat exchanger 52 as shown in FIG. 17.

In a typical situation, assuming the incoming air at 84 is warmer than room air, the polarity of the current is set so that the surface 92a of each thermoelectric cooling module 92 which contacts the finned heat sink 94 is cold and the surface 92b is hot to provide auxiliary cooling for the incoming air at 84. Reversing the polarity of the current will produce the opposite effect to add auxiliary heat to the incoming air 84 during winter months.

As shown in FIG. 4, the following sensors are provided within the ventilator 10: air flow monitors 100 and 102 in the exhaust and incoming air streams, respectively, and four high temperature cutout switches (HTCS) designated at 104, 106, 204 and 206 in FIGS. 4 and 11–16. The HTCS's are located on the heat exchangers used with the thermoelectric modules 92. These HTCS's are normally closed switches that open when the material they are in contact with exceeds approximately 200° F. Note that while the HTCS units are shown in FIGS. 12–15 on the DC side of the power supplies 132 and 159, they can be used in the alternative, if desired, to shut off power to these power supplies.

An inlet air temperature sensor 108 downstream of the heat exchanger 52 senses the temperature so that the incoming air 84 (supply air) can be conditioned to the temperature of the air being exhausted outside. The sensor 108 can be either a temperature controller or a thermostat of suitable known construction, depending on the accuracy and reliability required by the customer. The thermostat or temperature controller is shown at 108A in the wiring diagrams in FIGS. 11–13.

A dehumidification/defrost unit 91 (FIG. 4) for cooling or heating incoming supply air 80 includes thermoelectric modules 93 similar to modules 92 connected in heat transfer relationship between a heat sink 95 in the supply air stream 80 and a heat sink 97 in the exhaust air stream 49. The temperatures of the respective heat sinks are sensed by sensors 104 and 106. The operation of defrost/dehumidification unit 91 will be described below in connection with FIGS. 14 and 15.

Figure 19:
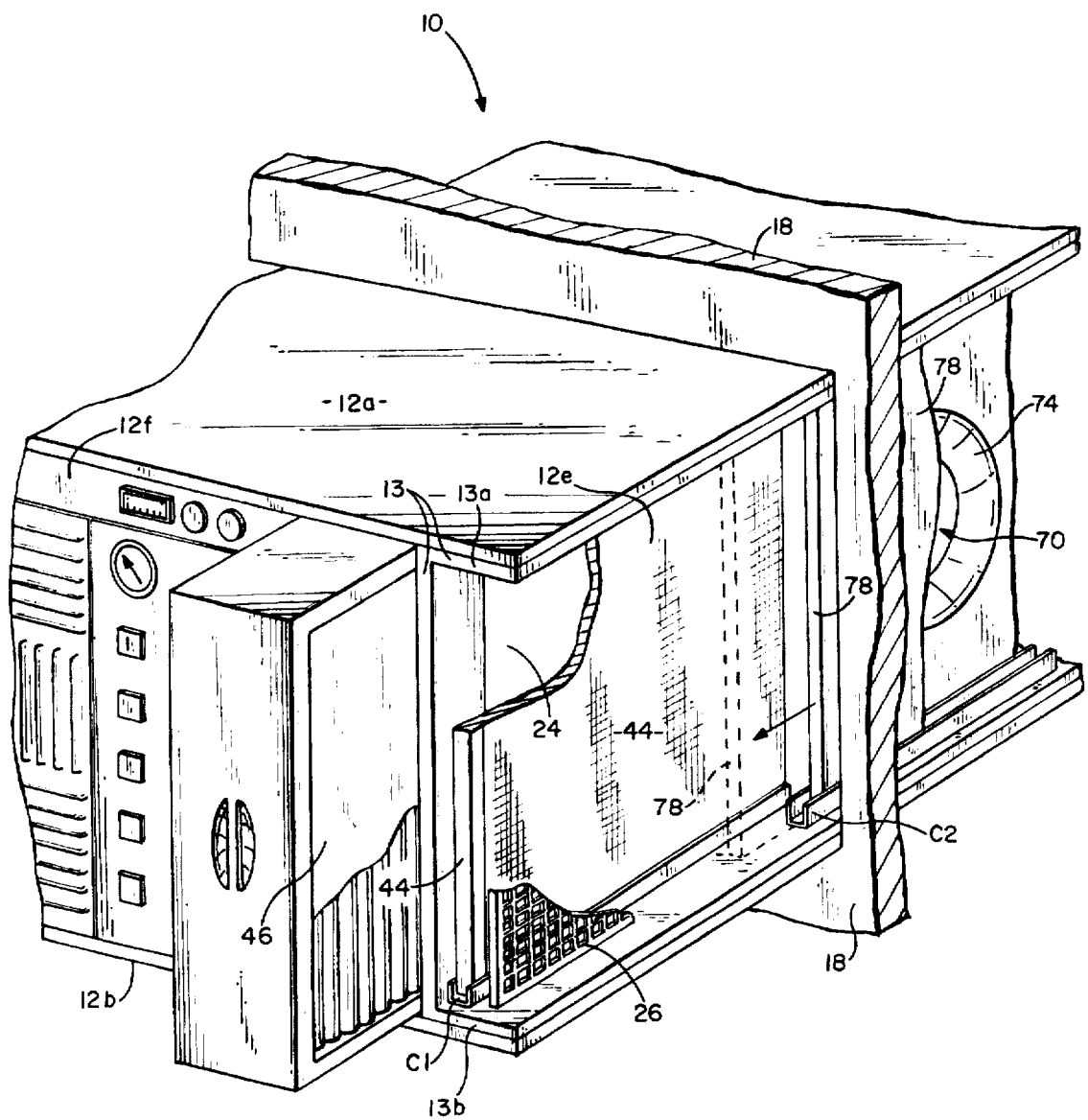
FIG. 19 is a partial perspective view showing how filters can be changed.

Refer now to FIG. 19 which illustrates how the filters can be changed in a modified form of the invention. FIG. 19 shows a ventilating unit 10 similar to that already described in FIGS. 1–8 in which corresponding numbers refer to the same parts already described. Top and bottom walls 12a, 12b can be rectangular sheets of strong, thermal and sound insulating material such as ⅛" thick fiberglass reinforced plastic panels. The right side wall 12e comprises a C-shaped beam member 13 having horizontal flanges 13a, 13b which are provided with channels C1 and C2 for supporting media filters 44 and 78. The channels C1 and C2 extend all the way from the front of the unit 10 to the far wall 12d (FIG. 4) and, as can be seen, the media filter 78 is accessible from inside the room so that when the media filters 44, 78 have to be changed, both of them can be removed and replaced by sliding them within the channels C1 and C2 The filter 78 can be pulled out manually and replaced as shown by grasping the vertical edge 78a and withdrawing the filter by sliding it toward the left through the channel C2, and then replacing it with a similar filter.

Figure 4A:
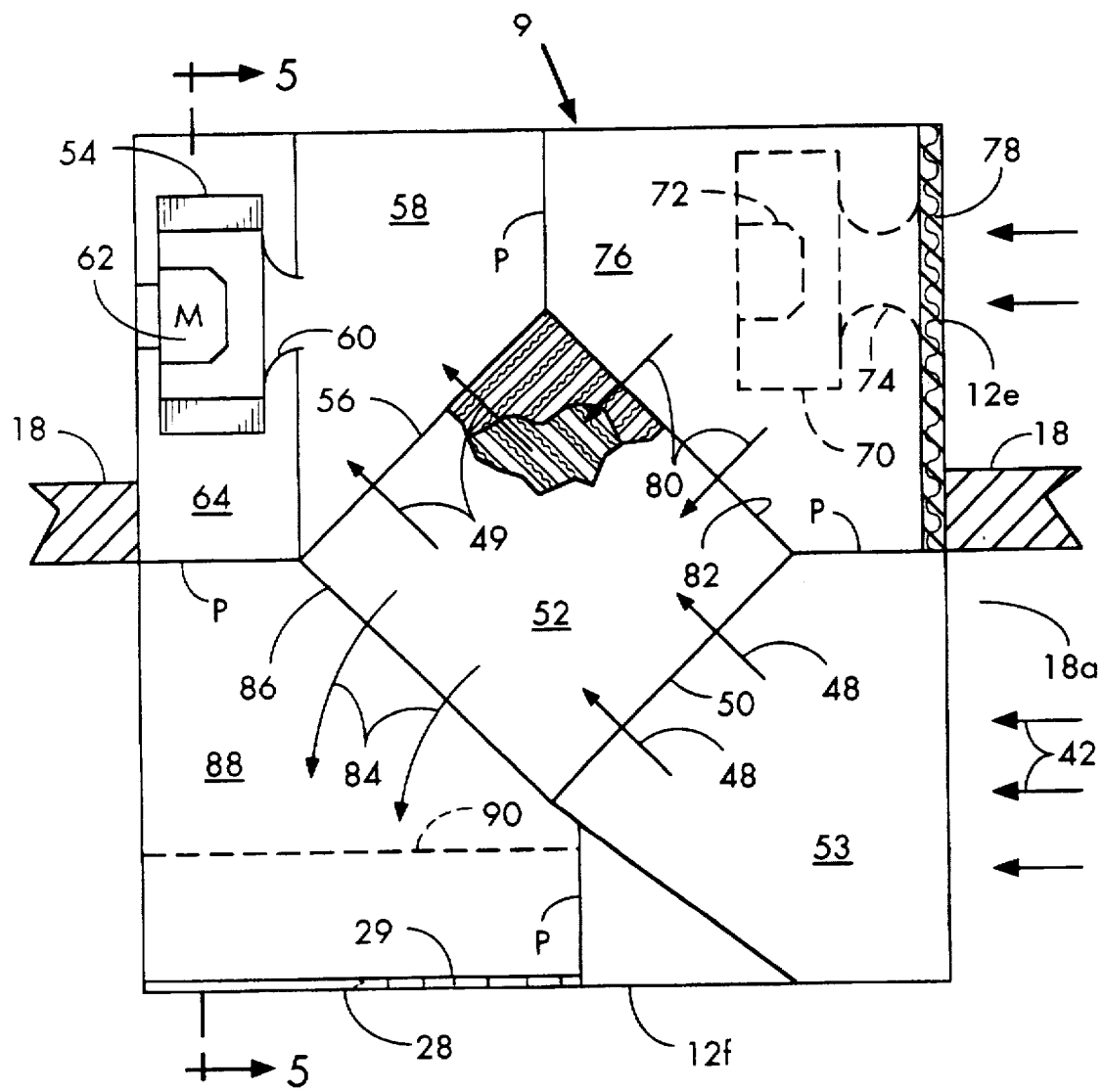
FIG. 4A is a view similar to FIG. 4 showing a modified form of the invention.

Refer now to FIG. 4A which illustrates a modified form of the invention that can be used, for example, in dedicated smoking rooms or other applications in which the requirements to prevent microbial contamination are not present. The overall structure indicated generally by the numeral 9 is generally similar to that shown in FIGS. 1–5 and the same numerals have been used to refer to corresponding parts already described. The main difference is that the following parts have been eliminated: exhaust air filters 44, 46; blower 70 and its drive motor 72 and inlet 74; filter 90; defrost/dehumidification unit 91; and the thermoelectric cooling modules 92 together with the associated heat sinks 64 and 94. If desired, the filter 44 can be provided, in which case it is preferably a lower cost filter equivalent to a furnace filter for the home. The heat exchanger 52 is mounted, as disclosed earlier, at a 45° angle with respect to the vertical side walls of the ventilation unit, and each edge or apex of the heat exchanger is connected to one of the vertical side walls by means of a vertical outwardly extending panel P which defines the inlet and outlet air ducts 53, 58, 76, 88. If desired, a strip-style electrical resistance or other type of heater (not shown) can be mounted in the unit to heat incoming fresh air.

In the embodiment of FIG. 4A, room air at 42 is exhausted through the duct 53 and is shown entering the heat exchanger 52 through openings in the wall 50 as a current of air 48 and emerging through openings in the wall 56 as indicated by the arrows 49. The movement of the air is accomplished by the blower 54 and motor 62 as already described. The air is then forced by the blower 54 into the outlet plenum 64 and is exhausted through an exhaust air outlet 38 already described. It will be noted that the room air does not pass through a filter. However, in some cases a filter similar to filter 44 can be used, if desired. Because the room inside the building wall 18 is closed except when people enter or leave the room, the blower 54 will establish a negative pressure in the room. The negative pressure maintained in the room by the blower 54 will draw fresh outside air through the filter 78 which can be an inexpensive or lightweight filter that provides a minimal pressure drop of any well known commercially available type such as that commonly employed as a furnace filter for the home. After passing through the filter 78, the air travels through the duct 76 and is drawn through the heat exchanger as shown by the arrows 80 entering through openings in the wall 82 and is then exhausted at 84 through the wall 86. After passing through the duct 88, the air enters the room through the outlet 28 which is covered by the grill 29. During operation, air within the room 18a is removed reliably and continuously through the positive action of the blower 54, and a negative pressure is established by the operation of the blower 54 within the room 18a. The negative pressure in the room will cause a supply of fresh air from the outside to be drawn through filter 78, duct 76, heat exchanger 52, and duct 88. The air then enters the room through outlet 28. Depending upon the efficiency of the heat exchanger 52, up to as much as about 75% to 80% of the heat in the room can be transferred to the incoming air at 84, thereby minimizing heat loss during winter months and preventing heat buildup in the room 18a during hot weather. Since there are no filters in the exhaust air stream, it is easy for the unit to maintain a negative room pressure throughout long periods of use. The light duty filter 78 will provide only a minimal pressure drop in the incoming supply of fresh air, and accordingly, the apparatus is highly effective in continuously replacing smoke-laden air with fresh air from outside using a single blower 54.

Another modified form of the invention is shown with dotted lines in FIG. 4A. In this embodiment, the blower/motor combination 54, 62 is eliminated and only the blower/motor combination 70, 72 is employed with an inlet 74 as already described in connection with FIG. 4. A small particle filter such as a HEPA filter 90 is also employed. This embodiment is otherwise similar to that already described in connection with FIG. 4A. This form of the invention is useful as a relatively inexpensive unit for supplying filtered, fresh outside air to a room while maintaining positive pressure within the room through the use of a single blower and can be applied, for example, for sick room applications where it is important to prevent the patient from being exposed to dust and micro-organisms from outside the building. An example of this is in the care of cancer patients where the primary objective is to prevent contamination from outside the room. In this embodiment, air drawn in through the duct 74 is forced by the blower 70 through the heat exchanger 52 at 80 and leaves at 84, then enters the room through the outlet 28 beneath the grill 29 after passing through the HEPA filter 90. In this way the patient is provided with fresh outside air that is free of microorganisms. The positive room pressure maintained by the blower 70 will also keep disease organisms from entering the room through cracks and around doors. Because the room 18a is closed except when people enter or leave, a positive pressure within the room will force room air at 42 out through the duct 53, through the heat exchanger 52 as shown at 48 and 49, into the outlet duct 58, and finally into the exhaust plenum 64 and out through the grill 38 (FIG. 4). As already mentioned, the blower 54 and its motor 62 are not present in this embodiment. Consequently, during operation a single motor/blower combination 70, 72 will maintain positive room pressure so as to keep the room clean while assuring that room air is simultaneously exhausted in heat exchange relationship with the incoming air to prevent heat loss/gain when the incoming and outgoing air are at different temperatures. Because there are no filters to restrict the flow of exhaust air, it will be easy for the single blower 70 to maintain adequate air flow at all times and keep the room above atmospheric pressure.

A preferred electrical schematic will now be described with reference to FIG. 10. Alternating current from power line at 110 passes through switch 111 and a manual on/off switch 112 which is also coupled to conductors 118, 120 to provide power through selector switch 109 to A & B for energizing thermoelectric modules 92 and 93, as well as providing current via conductors 118 and 120 to AC motor speed controllers 122, 124 for regulating the speed of variable speed blower drive motors 62, 72. While any suitable motor speed controllers can be used, one preferred controller 122, 124 is a Model QC 1000 variable speed motor control by Quantum Controls, Inc., of Chanhassen, Minn. Capacitors 101, 103, are wired to the variable speed split capacitor drive motors 62, 72, respectively. In the line 120 is a normally closed bimetallic switch 401 which has wired across it via conductor 402a a normally open relay 402 and a manual switch 403. Power is supplied to the relay 402 by conductors A, B via terminals A' and B'. The operation of switch 401 and relay 402 is described below.

If switch 109 is open, air recirculation only is provided, i.e., without heating or cooling. Current is supplied through conductor 118a to terminal E for operating the defrost/ dehumidification unit 91 as will be described below in connection with FIGS. 14 and 15. When heating or cooling is desired, selector switch 114 is switched to the appropriate position for heating or cooling to provide current to terminals C. When switch 114 is switched to "cool" position, the relay 133 (FIGS. 11–13) is placed in the cooling mode.

Connected to the motor speed controllers 122, 124 are optional alarm circuits 126, 128 each having a lamp and audible signal such as a bell or buzzer which is energized by the respective controller 122, 124 if the RPM of the blower reaches full speed or a preset speed. As will be described more fully, the motor speed controllers 122, 124 increase the speed of the blowers 54, 70 under the control of sensors 100, 102 as the filters begin to load with particulate material. The increased speed of the blowers counteracts plugging of the filters to maintain a constant airflow throughout the life of the filters. The alarm circuits 126, 128 will also operate whenever one or both of the blowers is not operating to provide a warning that the ventilating unit is not in operation.

When either of the blowers 54, 70 reaches approximately full speed, the respective alarm circuit 126, 128 will sound and the indicator lights will come on to let anyone present in the room know that it is time to change the filters. Manual switches 126a and 128a are wired in series in the alarm circuits to allow one to turn off the buzzers. The indicator light or lights will stay on until the filters have been serviced. Once the filters have been serviced, the pressure drop across the filters will be eliminated. The speed controllers 122, 124 will sense this and again run the blowers at the required speed to maintain the air flow at the selected level. When servicing the exhaust (contaminated) air stream, it is recommended that both filters 44 and 46 be changed at the same time. An optional blower RPM display (not shown) can, if desired, be incorporated into the circuit shown in FIG. 10 to provide a more accurate picture of the state of the filters for indicating when the HEPA filter 90 should be changed.

Servicing of the fresh air, i.e., supply air stream filters 78, 90 can be done by initially changing the pre-filter 78. This can be done without the need to change any other filter. The pre-filter 78 is preferably a high capacity, fairly efficient filter. This type of filter is used to extend the life of the HEPA filter 90. If the ventilating unit 10 requires additional servicing of the supply air stream filters 78, 90 in a fairly short time, it is recommended that the HEPA filter 90 be changed at that time. The pre-filter 78 can be changed repeated as long as the interval between filter changes is fairly long. The efficiency of the supply air stream 84 pre-filter 78 is higher than the exhaust air stream pre-filter 44 and has a higher capacity. For example, the pre-filter 78 can be a 1" thick Polytron filter and the pre-filter 44 can be a ½" thick Polytron filter from the Polytron Company of Beaumont, Tex. This design feature helps to minimize the cost of replacing expensive HEPA filters. If desired, pre-filter 78 can be a permanent cleanable filter.

The air flow sensors or monitors 100 and 102 shown in FIG. 4, e.g. hot-wire anemometers, are also shown connected to the motor speed control units 122, 124 in FIG. 10. The flow sensors 100, 102 are wired through the respective motor speed control units for sensing air flow. The speed controllers 122, 124 use this input to maintain a constant air flow as the filters become plugged. As the filters become plugged, the speed controllers 122, 124 increase the speed of the respective blowers until the blowers reach their maximum speed, whereupon alarm circuits 126, 128 show and/or sound an alarm as already described. This will serve as a warning to anyone in the room that in a short period of time the air will not be exhausted or that fresh air will not be carried into the room at the predetermined rate. The pressure within the room is kept below that of the surrounding space, i.e., a negative pressure differential is maintained between the room and the outside hallway. This is accomplished by the control circuits 122, 124 which are set to run the motors 62, 72 at different speeds and different static pressures. The fresh air introduced into the room will be about 300 cfm while air is exhausted at, say, about 330 cfm. This will accomplish about 6–10 air exchanges per hour in a room of up to 3,000 cubic feet. The motor speed control units 122, 124 accurately maintain the proper flow differential throughout operation even as the filters slowly become clogged with particulate material by running the motors at increasing speeds as already described. The initial speed can be set by adjusting the regulating potentiometers 123 and 125 and the speed controllers 122 and 124. Thus, during operation if the exhaust air flow drops, it will be sensed by the hot wire anemometer 100 which will in turn adjust the motor speed control 122 to speed up the motor 62. Control for the motor 72 is accomplished in a similar manner by the anemometer 102. In this way the speed of both blowers is changed to compensate for the increased air resistance in the filters over time due to dirt loading. Consequently, the proper flow is provided at all times to maintain a negative pressure differential between the room and the hallway. Alternatively, a pressure transducer can be used, if desired, in place of anemometers 100, 102. The sensing of a pressure increase would signify that the filters are plugged and, through the connection with the speed control units 122, 124, the proper motor speed adjustments are then accomplished and the desired pre-established air flow is constantly maintained. Current to the power supply for the thermoelectric cooling modules 92 is provided at terminals A & B as shown in FIGS. 11–13.

The ventilation apparatus 10 also includes an optional additional alarm 129, particularly useful when the apparatus is used for ventilating areas contaminated with disease organisms. The alarm 129 shown in FIG. 10 is connected through the control circuits 122, 124 via two relays 416 and 414, respectively, to the airflow monitors 100, 102 in the exhaust and incoming air streams. Terminals G', H' of relay 414 are connected to terminals G and H of controller 124, and terminals J', K' are connected to terminals J and K, respectively, of relay 416. If power is cut off to terminals G and H, then the armature of solenoid 414 shifts to the closed position and alarm 129 sound. If for some reason the exhaust blower 62 or the supply blower 72 trips a circuit breaker, the warning light and buzzer assembly 129 will be activated to indicate that the air is not being circulated properly and the ventilating apparatus is not functioning as it was intended to, i.e., air circulation is below a predetermined level. Manual override switch 129a can be used to stop the audible alarm.

Figure 11:
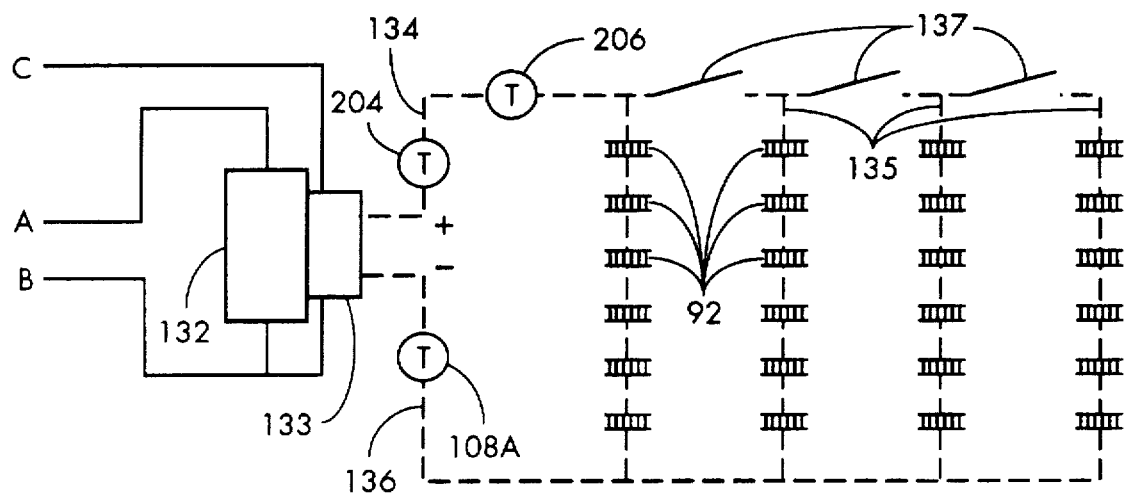
FIG. 11 is a schematic diagram showing a first mode of operation for supplemental air heating/cooling.
Figure 12:
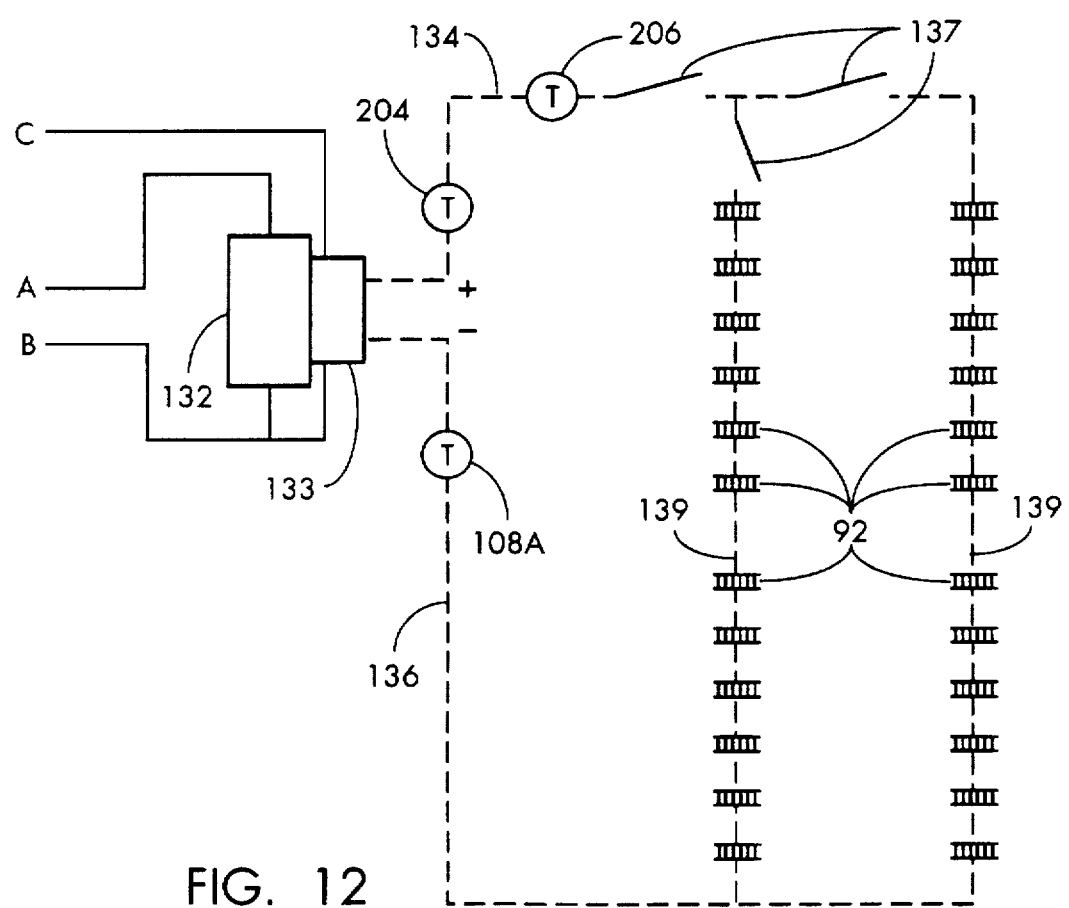
FIG. 12 is a schematic diagram showing a second mode of operation for supplemental air heating/cooling.
Figure 13:
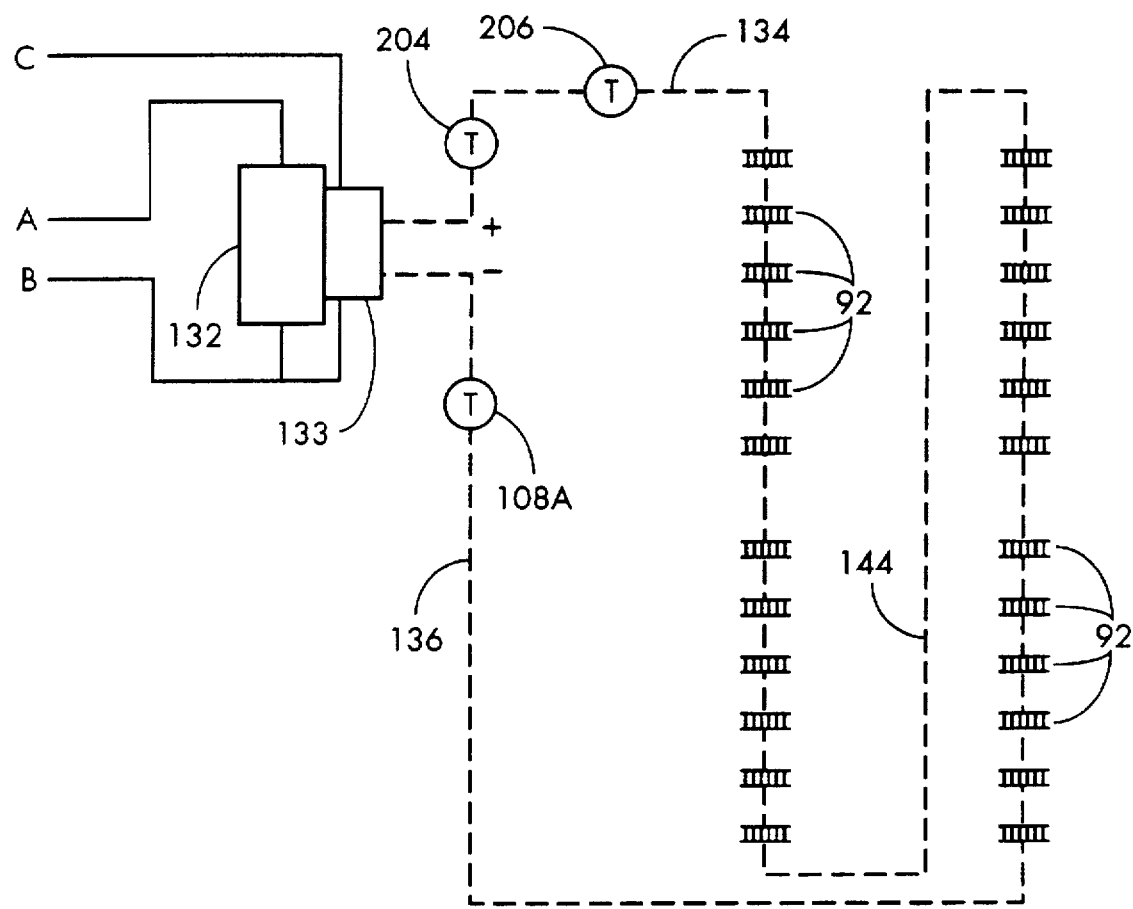
FIG. 13 is a schematic diagram showing another mode of operation for supplemental air heating/cooling.

Refer now to FIGS. 11–13 which illustrate diagrammatically different ways of connecting the thermoelectric cooling modules 92. Any suitable switching means such as selector relays (not shown) can be used to shift from one arrangement, such as that in FIG. 11 to that of FIG. 12 or to that of FIG. 13. For clarity of illustration the selector relays are not shown in FIGS. 11–13. Briefly, a plurality of thermoelectric cooling modules 92 are wired in series and selector switching means is provided for wiring at least some of the series-connected modules 92 in parallel with one another to change the heating and cooling efficiency of the thermoelectric modules 92 by changing the voltage to each module 92. In all cases, electric power at terminals A & B is fed to a DC power supply 132 having a pole-reversing switch 133.

Refer now to FIG. 11. A first mode of operation will now be described in connection with FIG. 11. The arrangement shown in FIG. 11 illustrates how the thermoelectric cooling modules 92 are connected for providing the maximum heat to the incoming air at 84. With this wiring configuration, more heat is obtainable than is required to bring the outside air up to room temperature. The thermoelectric cooling modules 92 are wired in this case in a series parallel arrangement with four rows of six series-connected modules 92 coupled in parallel across the DC power lines 134, 136 to provide the highest voltage to each cooling module 92 for the greatest amount of heating. To provide cooling, the polarity of the power lines 134, 136 is reversed. Between each of the series-connected lines 135 are provided switches 137, any number of which can be opened beginning with the switch at the right in the figure to provide heat to the incoming air until the desired maximum temperature is reached. Thus, during operation if only a small amount of heat is needed, all of the switches 137 can be kept opened to supply current only to the six modules 92 at the left. However, if a greater amount of heat is to be supplied to the incoming air stream at 84, the switches 137 are closed progressively beginning at the left. As this is done, the energized thermoelectric cooling modules 92 will supply a greater amount of heat and will accomplish heating at lower temperatures.

Refer now to FIG. 12. FIG. 12 illustrates diagrammatically how the same twenty-four thermoelectric cooling modules 92 are arranged for 100% cooling of the incoming air at 84. In this case, the power supply 132 is connected through the pole-reversing switch 133 to provide approximately 110 volts/DC of either polarity to conductors 134, 136 which are in this case wired across two series-connected lines 139, each with twelve of the thermoelectric cooling modules 92. By connecting the thermoelectric cooling modules 92 in this way, each module 92 will receive about 9.17 volts. The pole-reversing switch 133 is set to provide a cold junction at each of the surfaces 92a connected to the heat sink 94 of FIG. 7 to maximize the cooling of the incoming air 84.

Refer now to FIG. 13 which illustrates a circuit for the same twenty-four cooling modules 92 providing the best voltage for maximum efficiency where less cooling is needed. In this case, it will be seen that all twenty-four thermoelectric cooling modules 92 are connected in series with each other by a conductor 144 so that each of the thermoelectric cooling modules 92 will receive about 4.6 volts. This arrangement is used when the least amount of cooling is required.

Figure 14:
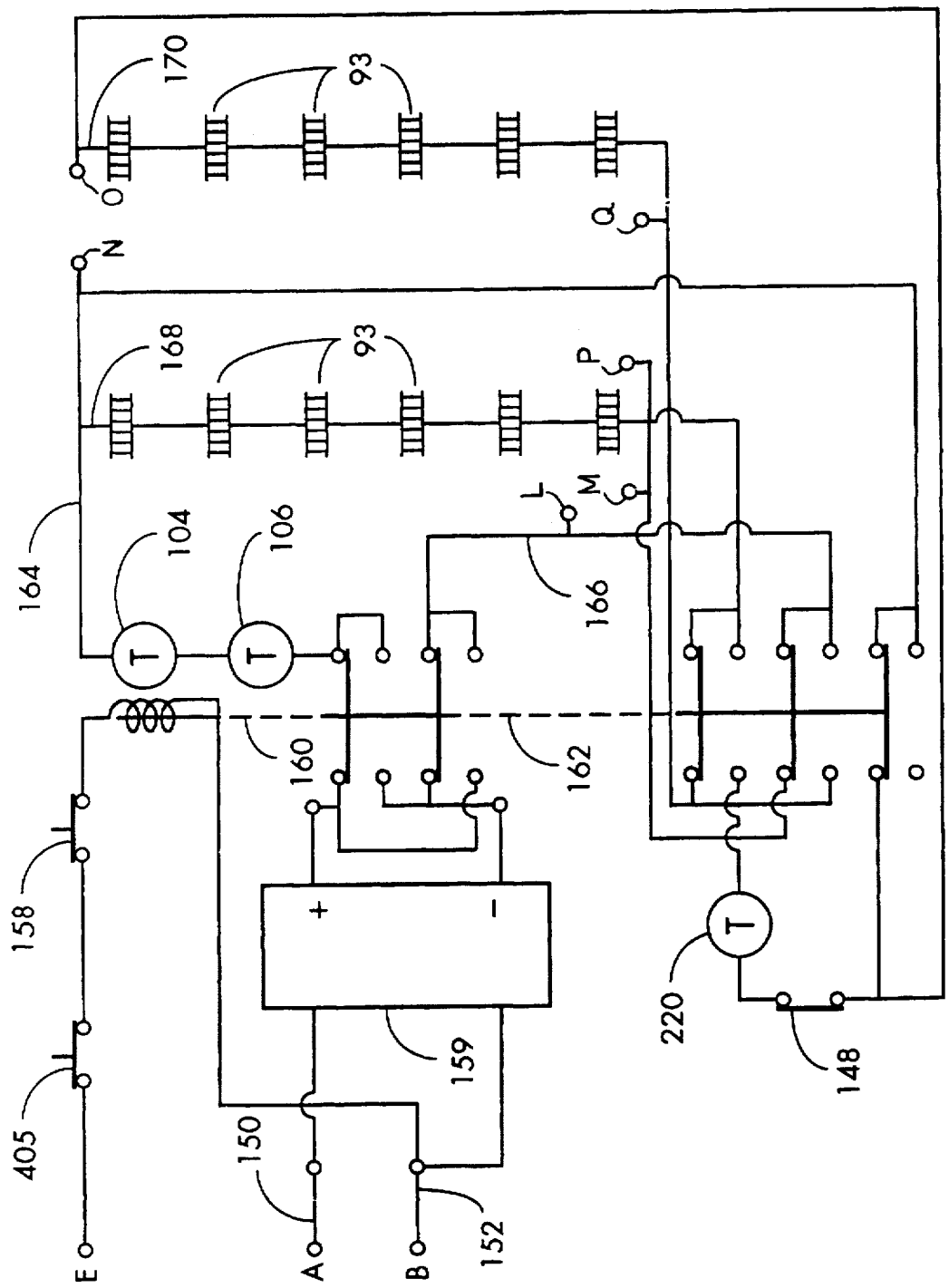
FIG. 14 is a schematic diagram of the incoming air dehumidifier/defrost unit shown in the defrost mode.
Figure 15:
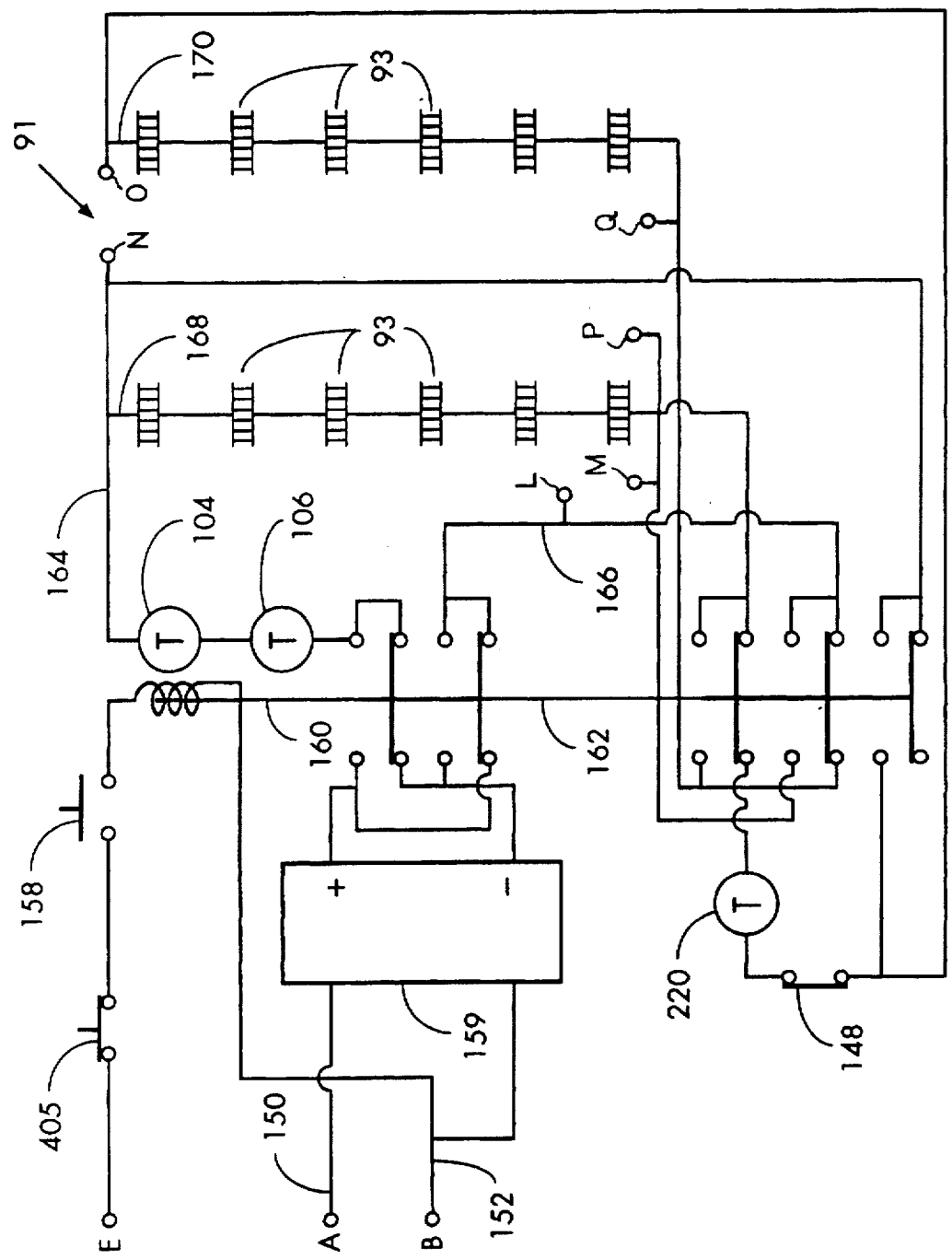
FIG. 15 is similar to FIG. 14 but illustrates the dehumidification mode.

Refer now to FIGS. 14 and 15. These figures show the circuits for the defrost and dehumidification unit 91 (FIG. 4). The defrost/dehumidifying unit 91 receives current from terminals A & B via conductors 150, 152 which supply AC power to DC power supply 159 and to twelve thermoelectric cooling modules 93 which are wired in series/parallel to the power supply 159 via pole-reversing switch and relay 162 connected to a relay coil 160 wired across switches 158, 405 to the line 152 and terminal E. The modules 93 are wired in two parallel groups of six in series via closed relay contacts 121, 123 between them and closed contacts 127 which connect both sets of six to lines 164, 166 to the contacts of relay 162. Line 164 has two thermostatic switches 104, 106 which are connected to a negative terminal of relay 162 through thermostatic switches 220 and a manual dehumidification switch 148.

FIG. 14 shows schematically how the thermoelectric modules 93 are connected when the unit 91 is in a defrost mode in which incoming air is warmed, e.g., in winter months. The unit 91 can enter a defrost mode any time a bimetallic switch 158 in series with the relay coil 160 senses a temperature of 32° F. or below on the face of the air-to-air heat exchanger 52. Switch 158 is normally open but closes at approximately 32° F. When bimetallic switch 158 closes, it energizes the coil 160 so that the pole-reversing switch and relay 162 assumes the position shown in FIG. 14. When the pole-reversing switch and relay 162 is in this position, the thermoelectric cooling modules 93 used to heat the heat sink 95 are energize with DC current of the proper polarity via conductors 164, 166, thereby adding heat to the supply side air stream 80 as it enters the air-to-air heat exchanger 52. Heat added to the supply side air stream 80 helps to melt any ice that may have started to form at the coldest spot on the heat exchanger 52.

Defrosting the air may also be accomplished by slowing down or shutting off the supply air blower motor 72. This mode of operation is accomplished by the bimetallic switch 401 (FIG. 10) which is normally in a closed position. If switch 401 senses a temperature of 32° F. on the face of the air-to-air heat exchanger 52, it opens and cuts power to the supply fan controller 124. When the thermoelectric defrost unit 91 is operating (FIG. 4), relay 402 closes and bypasses the open connection across switch 401 and the supply air blower motor 72 remains running when the unit is in a defrost mode.

A manual switch 403 (FIG. 10) allows a service technician to turn off blower motor 72 even when the thermoelectric modules 93 are energized. Another manual switch 405 (FIG. 14) allows the service technician to over-ride the ability of the defrost switch 158 to put the unit into defrost when it senses defrosting is required. Note that the defrost mode may also be accomplished using a pressure differential switch (not shown) to initiate defrost and a high temperature cutout switch (not shown) to terminate the defrost cycle in case the single bimetallic switch 158 that closes at 32° F. does not work reliably.

FIG. 14 shows the configuration of the thermoelectric modules 93 when defrost has been initiated by the bimetallic switch 158. The polarity relay 162 is shifted to the position shown. At the same time, the relay contacts of relay 162 that change the configuration of the wiring of the thermoelectric modules 93 are energized. This connects the two banks of six thermoelectric modules in parallel with each other as seen in the figure. The configuration relays 162 make the following connections when the unit is in the defrost mode. L and M are connected together, N and O are connected together, and P and Q are connected together. In this configuration the thermoelectric modules 93 receive approximately 18.3 volts each.

Refer now to FIG. 15. FIG. 15 illustrates schematically the manner of connecting the same twelve thermoelectric modules 93 when the unit 91 is in the dehumidification mode. Manual switch 148 must be turned on to initiate dehumidification. If the bimetallic temperature sensing switch 158 senses a temperature of 32° F. or below on the air-to-air heat exchanger 52 and determines that defrosting is required, the polarity to the thermoelectric modules 92, 93 is reversed by the polarity reversing switch 162 when the bimetallic switch 158 closes. In instances when the manual dehumidification switch 148 is on and defrosting is not called for, the thermostat, i.e., temperature controller 220 will control the level of dehumidification based on a manual setting of a potentiometer (not shown) as a part of the controller 220. It should be noted that the configuration switch and relay 162 also changes the wiring configuration of the thermoelectric modules 93 through relay contacts 221, 223, 225 and 227 so that all twelve modules 93 are wired in series across the 110 volt DC power supply (FIG. 15). Thus, FIG. 15 shows the configuration of the thermoelectric modules 93 when defrost is not required and the dehumidification switch 148 is switched on. This connects the two banks of six thermoelectric modules 93 in series as shown. The configuration relay 162 makes the following connections when the unit is in the dehumidification mode and defrost is not required. P and O are connected together, and Q and L are connected together. In this configuration, the thermoelectric modules 93 receive approximately 9.15 volts each.

During dehumidification, when incoming air 80 comes in contact with the cold finned heat sink 95 at or below the dew point of the incoming air, moisture will be removed from the air stream. Any moisture removed is run through a tube (not shown) to the exhaust blower air stream where it is mixed into the exhaust air stream 49.

The invention provides a self-contained, preferably portable, ventilation module that is highly effective in removing room air containing contaminants such as tuberculosis bacillus, volatile organic compounds, and other harmful substances. The invention allows a hospital or manufacturing facility to provide replacement air from the outside of a building without the need for redesigning the existing building heating and ventilating air conditioning system. The ventilation unit of the present invention has a heat exchanger which minimizes the cost associated with replacing the air in the portion of the building that is being ventilated. The ventilating apparatus of the present invention can be mounted either in an existing window or wall. If desired, the apparatus can also be mounted on wheels or hung from the ceiling so that inlet and outlet ducts can be run through an existing window, wall, ceiling or other ductwork running to the outside of the building.

The apparatus illustrated in FIGS. 1-5 includes two separate fans or blowers for incoming and outgoing air streams and filters for filtering both air streams. The blowers can be powered by the same motor. When this is done the blowers should have different pitches or diameters, or a speed changer should be used between the motor and one of the blowers to obtain the differential pressure between the room and the corridor and other surrounding spaces. It is, however, preferred to use two separate blower drive motors. The blower that removes air from the room is set to provide a greater capacity than that used to transport clean outdoor replacement air into the room. This relationship insures that the room being ventilated is at a lower pressure than the surrounding rooms and hallways so that airborne contaminants will not be carried from the ventilated room into the rest of the building through cracks around doors, etc. This is especially beneficial in the case of tuberculosis wards which must be isolated from the rest of the hospital. It will also reduce the tuberculosis organisms level in the room that is being ventilated, thereby providing a safer workplace for health care personnel. This is particularly important since infected health care workers can expose many other people.

A preferred form of the invention includes thermoelectric semiconductive heating/cooling modules, for convenience referred to as "thermoelectric cooling modules" to provide auxiliary heating or cooling and to provide a degree of humidity control.

A variety of air cleaning technologies can be used, including media filters, HEPA filters, ULPA filters, UV lights, electrostatic filters, electrostatic precipitators and/or carbon filters (carbon beds) for both incoming and outgoing air as required by the needs of a particular application. This provision allows the apparatus to remove contaminants from the outgoing air while maintaining negative pressure ventilation in a tuberculosis isolation room. In addition, the apparatus preferably cleans the incoming air before it enters the room.

It is also preferred that the unit be equipped with a manometer or suitable gauge known in the art to provide continuous verification that a pressure differential exists between incoming and outgoing air streams. In an alternative form, anemometers can also be placed in or adjacent to filters to allow maintenance personnel to recognize when the filters have become loaded and require replacement. Air speed indicators can be used to sense the relative speed of incoming and outgoing air streams.

A glove bag is provided. The glove bag is used to enclose the filter during and after removal, i.e., to change filters. This is especially important when the apparatus is used in tuberculosis isolation rooms because it will minimize the exposure of maintenance personnel to tuberculosis or any other undesirable material that has been captured on the filter, thereby reducing the possibility of spreading the disease to other areas.

The device is also designed in such a way that the supply and exhaust blowers are both located behind the heat exchanger and the filters, i.e., on the side furthest from the room to help minimize the noise level within the room. The blower speed is also set to minimize the noise based on the blockage of the HEPA filters and also to maintain the required exchange of air in cubic feet/minute. As the static pressure across the filters increases, a provision is preferably made for changing the blower speed to maintain a required air flow to assure a negative pressure differential between the room and surrounding rooms and hallways.

Energy is transferred from exhausted air to the incoming fresh outside air using a heat exchanger that typically operates at a 70%–85% efficiency. This provision minimizes the expense of exhausting the contaminated room air which is air that in most cases has been heated or cooled, i.e., conditioned depending on the season. The incoming outside air is filtered and can be further conditioned by the apparatus, i.e., heated, cooled or dehumidified, to make up any energy difference that was not recaptured from the exhausted air stream.

Both the supply and exhaust air streams are preferably filtered using HEPA filters. The life of the HEPA filters is extended using less expensive pre-filters for removing larger particles from the air stream before it passes through the HEPA filters.

The outside air can be conditioned with the invention by means of the thermoelectric cooling modules 92 which function as a heat pump mechanism that in certain instances actually gives off more heat than the electricity input to the thermoelectric cooling modules. This is accomplished when the modules 92 acting as a heat pump mechanism transfer energy from the outside air back into the room in addition to the heat produced by the electrical energy supplied to them.

On days when the outside temperature is warmer than the room temperature, the heat pump can be run in reverse by reversing the polarity of current to the modules 92 to bring the temperature of incoming air down to the temperature of the room air that is being exhausted to the outdoors. It will be noted that both heating and cooling is accomplished without the use of a compressor system.

The ventilating unit 10 of the present invention can be installed in a variety of different mounting configurations. The ventilating unit 10 can be mounted both horizontally and vertically through a wall or window opening. If the ventilating unit 10 is mounted entirely within the room and not in a window as shown in FIG. 1, the ductwork 20, 22 is connected to and extends through openings in the wall of the building. Air ducts of the type shown at 21, 23 are also used when the ventilating unit 10 is mounted entirely on the outside of a building. The ventilating unit 10 can be supported by the floor or can be hung from a ceiling if the required support members are available.

The ventilating unit of the present invention is intended primarily for use in medical applications but is not limited to this end use. The ventilating unit 10 can also be used in other applications such as nursing homes, private homes, restaurants, bars and industrial applications that require very clean air or in any application that requires high efficiency air or gas filtration. In some applications it is not necessary to transfer heat from one air stream to another. In such a case, the heat exchanger 52 can be eliminated and replaced with two ducts which merely cross one another or replaced with what is known as an air flow cube to direct the exhaust and incoming air flow paths across each other but in a much less expensive way than a heat exchanger 52.

Negative pressure can be maintained by keeping exhaust flow greater than inlet flow. This is accomplished by adjusting the speed controllers 122, 124 so that the fresh inlet air flow ranges from, say, 10% to 99% of the exhaust air flow. The ventilating unit 10 is not, however, limited to operation with a negative pressure differential in the room. If it is desired to maintain a positive pressure within a room, the relative air flow of the same streams can be reversed.

The ventilating unit 10 can also be set, if desired, to provide greater air exchanges per unit of time through a recirculation system. This can be accomplished, for example, by redirecting some of the air that would normally be exhausted through the outlet opening 38 into the air stream 84 which would then pass through the filter 90 and back into the room through the outlet 28. This would have a disadvantage, however, especially for hospital use, by allowing the filtered, previously contaminated air to be reintroduced into the room.

The ventilating unit of the present invention can also be wired into the standard fire detector interlock 111 (FIG. 10) used in a building fire alarm system. With such a connection, if one of the building fire alarms went off, the ventilating unit 10 would then be automatically shut down by the opening of the switch 111. The ventilating unit 10 can also, if desired, be supplied with its own fire response (not shown) for shutting off the outside air supply when a fire occurs. The main intent of this feature is to prevent the ventilating unit 10 from feeding a fire with outside air. The fire response can also be wired to shut down the outside air supply fan 72 and keep only the exhaust fan 62 running in the event of a fire. Doing so would provide the benefit of exhausting smoke from the room without introducing additional outside air.

In another modified form of the invention, the ventilating unit 10 is constructed to increase air flow of the exhaust blower 62 and/or shut down the inlet blower when the door to the room opens. This will help to maintain a negative pressure differential between the room and an adjoining corridor on the other side of the door.

The invention minimizes blower noise. The level of noise heard in the room is minimized by several design features including (1) mounting the supply and exhaust blowers outside the room when the unit is mounted through an outside wall or window, (2) providing speed control for the blowers, (3) blocking the blowers, i.e., placing them behind the heat exchanger and ductwork to minimize line-of-sight noise carried through the heat exchanger and filters and the housing 12. The potentiometers 123, 125 of the speed controllers 122, 124 allow for the adjustment of air flow based on altitude.

It should also be noticed that the air exhausted through the grill 40 is directed upwardly away from the building. This will help to minimize line-of-sight noise that would otherwise be more noticeable to those outside.

Other variations can be made. To capture disease organisms at their source, an inlet duct can be attached to the air inlet of the apparatus and the other end connected to an inlet hood, e.g., a hood surrounding a chair or examining table where an infected patient is located.

Many variations of the present invention within the scope of the appended claims will be apparent to those skilled in the art once the principles described herein are understood.

What is claimed is:

1. A portable self-contained ventilation apparatus for a room within a building comprising,
   a housing having top, bottom and side walls,
   a first blower connected to an exhaust air duct communicating between a room exhaust inlet and a room exhaust outlet opening for expelling room air to the atmosphere outside of the building, a second blower connected to a fresh air inlet duct communicating between an outside air inlet and a fresh air outlet opening for feeding fresh outside air into the building, an air filter within at least one of said air inlet and exhaust air ducts for filtering, the air passing therethrough, a heat exchanger operatively connected between said ducts for exchanging heat between the fresh air in the inlet duct and the exhaust air passing through the exhaust air duct, blower speed control means connected to at least one of the blowers for changing the speed of said one blower, a sensor operatively connected to the blower speed control means said control means maintains a pressure differential between atmospheric air and the air within the room as the filter gradually become plunged with particulate material, and at least one semiconductive thermoelectric cooling module is located externally of the heat exchanger in heat transfer relationship with the flesh air in the inlet duct and a source of electric current is connected to said module to thereby heat or cool said fresh air.

2. The apparatus of claim 1 wherein said at least one semiconductive thermoelectric cooling module comprises a plurality of thermoelectric cooling modules are connected between a first heat sink in heat transfer relationship with the exhaust duct air and a second heat sink in heat transfer relationship with the inlet duct air.

3. The apparatus of claim 2 wherein the thermoelectric cooling modules are connected in a plurality of series-connected lines and said series-connected lines of modules are connected in parallel with one another across the source of electric current.

4. The apparatus of claim 2 wherein all of the thermoelectric cooling modules are connected in series relationship with the source of electric current.

5. The ventilating unit of claim 1 wherein said at least one semiconductive thermoelectric cooling module comprises a plurality of thermoelectric cooling modules and electric switching means is connected to the thermoelectric cooling modules for connecting different numbers of thermoelectric cooling modules in series across said source of current to thereby change the voltage drop across the thermoelectric cooling modules for heating or cooling the incoming air with different degrees of efficiency.

6. The apparatus of claim 2 wherein the second heat sink has a surface connected in heat transfer relationship with surfaces of the thermoelectric cooling modules which are opposite surfaces of the modules that are connected to the first heat sink and the second heat sink is mounted in heat transfer relationship with the air passing through the fresh air inlet duct.

7. The apparatus of claim 2 wherein the locations at which the first and second heat sinks contact air passing through the ducts are both downstream from the heat exchanger.

8. The apparatus of claim 1 wherein a heater is in heat transfer relationship with the fresh outside air stream upstream of the heat exchanger for defrosting or dehumidifying the fresh outside air.

9. The apparatus of claim 1 wherein the heat exchanger is a cross-current heat exchanger of generally rectangular configuration with inlet and exhaust air passing one another at substantially right angles while heat is conducted from one air stream to another within said heat exchanger.

10. The apparatus of claim 1 wherein an alarm means is connected to a sensor means for providing audible or visual notification of the blockage of one or more of said filters.

11. A ventilation apparatus according to claim 1, wherein the ventilation unit has side walls, a pair of horizontally extending upwardly opening slide channels for supporting a pair of filters including an exhaust air filter and an inlet air filter that is located on a portion of a side wall of the apparatus that is outside of the building and is accessible from within the building, whereby both of said filters can be removed and replaced manually from within the building.

12. The ventilation apparatus of claim 1 wherein a fire alarm is connected to the ventilating apparatus for shutting off the ventilating apparatus when a fire is detected in the area where the ventilating apparatus is used to prevent smoke from being drawn into the room and to prevent fresh air from being fed into the room when there is a fire in the building.

* * * * *